United States Patent
Honda

(10) Patent No.: US 9,770,890 B2
(45) Date of Patent: Sep. 26, 2017

(54) APPARATUS AND METHOD FOR MANUFACTURING THIN FILM, ELECTRO-CHEMICAL DEVICE AND METHOD FOR MANUFACTURING ELECTRO-CHEMICAL DEVICE

(71) Applicant: PANASONIC CORPORATION, Osaka (JP)

(72) Inventor: Kazuyoshi Honda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 111 days.

(21) Appl. No.: 14/290,366

(22) Filed: May 29, 2014

(65) Prior Publication Data
US 2014/0356728 A1    Dec. 4, 2014

(30) Foreign Application Priority Data

May 30, 2013 (JP) .................................. 2013-114419

(51) Int. Cl.
H01M 10/0585    (2010.01)
H01M 10/0525    (2010.01)
(Continued)

(52) U.S. Cl.
CPC ....... *B32B 37/0053* (2013.01); *H01M 4/0407* (2013.01); *H01M 4/0409* (2013.01);
(Continued)

(58) Field of Classification Search
None
See application file for complete search history.

(56) References Cited

U.S. PATENT DOCUMENTS

| 5,076,203 A | 12/1991 | Vaidya et al. |
| 5,116,662 A * | 5/1992 | Morman .................. B32B 5/04  428/152 |
| 2007/0204457 A1* | 9/2007 | Sato ........................ H01M 4/13  29/623.1 |

FOREIGN PATENT DOCUMENTS

| JP | 01-152262 A | 6/1989 |
| JP | 06-330320 A | 11/1994 |

(Continued)

OTHER PUBLICATIONS

Fine Chemical Japan Co., Ltd., SDS FC-169.*
English translation JP2007273210A.*

*Primary Examiner* — Patrick Ryan
*Assistant Examiner* — Victoria Lynch
(74) *Attorney, Agent, or Firm* — McDermott Will & Emery LLP

(57) ABSTRACT

A thin film production apparatus which includes: a substrate feeding mechanism configured to continuously feed a substrate; a substrate receiving mechanism configured to receive the substrate; a substrate conveying mechanism; a film formation roller; a first film formation source configured to form a first thin film on a film formation surface of the substrate traveling on an upstream side of the film formation roller in a substrate conveyance direction along the substrate conveying mechanism; and a second film formation source configured to form a second thin film on a roller circumferential surface of the film formation roller. The film formation roller is placed so that the second thin film is joined to the first thin film. The second thin film is formed to a greater thickness and/or at a higher deposition rate than the first thin film.

12 Claims, 19 Drawing Sheets

(51) Int. Cl.

| | | |
|---|---|---|
| *B32B 37/06* | (2006.01) | |
| *B32B 38/00* | (2006.01) | |
| *B32B 37/00* | (2006.01) | |
| *B32B 37/10* | (2006.01) | |
| *H01M 4/04* | (2006.01) | |
| *H01M 4/139* | (2010.01) | |
| *H01M 10/058* | (2010.01) | |
| *H01M 6/40* | (2006.01) | |
| *B32B 37/20* | (2006.01) | |
| *B32B 37/24* | (2006.01) | |

(52) U.S. Cl.
  CPC ............. *H01M 4/139* (2013.01); *H01M 6/40* (2013.01); *H01M 10/058* (2013.01); *B32B 37/20* (2013.01); *B32B 2037/243* (2013.01); *B32B 2309/68* (2013.01); *B32B 2429/00* (2013.01); *H01M 10/0525* (2013.01); *Y10T 29/49115* (2015.01)

(56) References Cited

FOREIGN PATENT DOCUMENTS

| JP | 2003-308609 A | | 10/2003 | |
|---|---|---|---|---|
| JP | 2007273210 A | * | 10/2007 | ............. H01M 4/02 |

\* cited by examiner

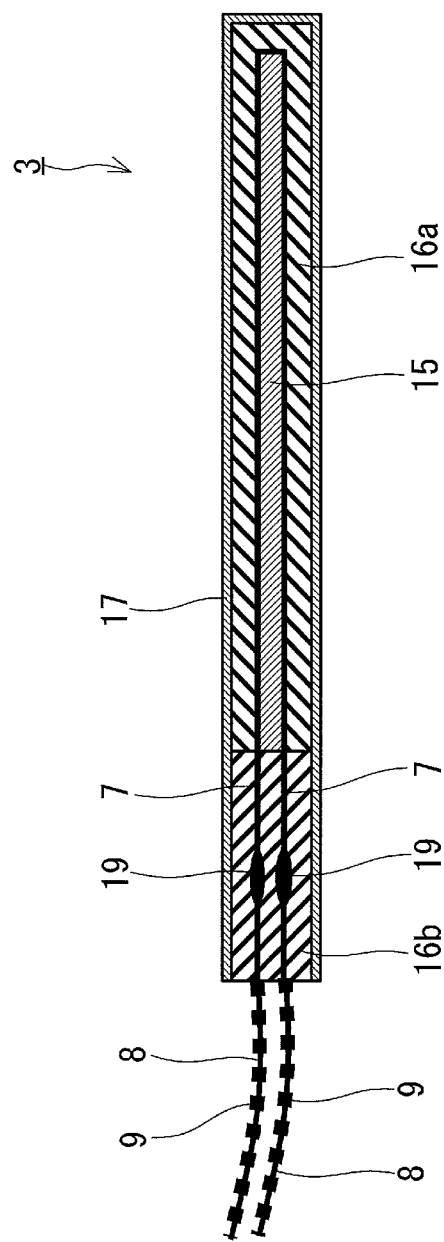

APPARATUS AND METHOD FOR MANUFACTURING THIN FILM, ELECTRO-CHEMICAL DEVICE AND METHOD FOR MANUFACTURING ELECTRO-CHEMICAL DEVICE

BACKGROUND OF THE INVENTION

1. Field of the Invention

The present invention relates to a thin film production apparatus, a thin film production method, an electrochemical device, and a method for producing the electrochemical device.

2. Description of Related Art

Thin film technology is widely employed for performance improvement and size reduction of devices. Production of devices using thin films not only provides direct benefits to users, but also plays an important roll in environmental aspects, such as in preservation of earth resources and in reduction of power consumption.

For advancement of such thin film technology, it is indispensable to meet various demands in terms of industrial use, that is, to achieve high efficiency, high stability, high productivity, and cost reduction of thin film production methods. Efforts to this end have continued to be made.

A film formation technique that allows a high deposition rate is essential in order to increase the productivity of thin films. Increase in deposition rate is being pursued in thin film production methods such as vacuum deposition methods, sputtering methods, ion plating methods, and CVD methods (Chemical Vapor Deposition Methods). A thin film production method employing a roll-to-roll process or employing successive conveyance of plate substrates is used as a method for continuously forming thin films in large numbers. The roll-to-roll thin film production method is a method in which: an elongated substrate wound in a roll is unwound and fed from an unwinding roller; a thin film is formed on the substrate being conveyed on a conveyance route; and the substrate is then wound on a winding roller. Thin films can be produced with high productivity, for example, by combining the roll-to-roll type thin film production method and a film formation source that yields a high deposition rate, such as a vacuum deposition source using an electron beam.

In many cases where thin films are formed at a high rate, heat input to the substrate caused by film formation poses a problem. Similarly, in the case of film formation in which a plurality of thin films are formed one on top of another, deterioration of thin film quality caused by heat input to the thin film previously formed on the substrate may pose a problem. In order to solve these problems, various proposals have been made for methods for cooling the substrate.

JP 1-152262 A describes an apparatus for forming a thin film on a web serving as a substrate, and describes introducing a gas into a region between the web and a support means supporting the web. With this apparatus, heat conduction between the web and the support means can be ensured and, therefore, increase in the temperature of the web can be reduced.

JP 2003-308609 A describes a method for producing a recording medium having: a polymer base material; a recording layer formed on one surface of the polymer base material; and a reinforcing layer that is a thin metal film formed on the other surface of the polymer base material. This method is as follows: a polymer base material on one surface of which a recording layer has been previously formed, and a rotatable cooling support at least whose surface is formed of a dielectric material, are brought into a state in which the recording layer is located between the polymer base material and the rotatable cooling support; an electrostatic attractive force is generated between the recording layer and the rotatable cooling support to bring the recording layer and the rotatable cooling support into close contact; and, in this state, a reinforcing layer is formed on the other surface of the polymer base material. With this method, the thermal load imposed on the polymer base material by the formation of the thin metal film, and thereby the occurrence of thermal defects of the polymer base material, can be effectively reduced.

JP 6-330320 A describes a roll-to-roll vacuum deposition apparatus configured to covey a substrate along a carrier belt, and describes cooling the carrier belt by an electric cooler. With this apparatus, deterioration and deformation of the substrate by heat can be prevented, and deposition over a long length can be carried out with a high deposition efficiency.

SUMMARY OF THE INVENTION

In mass production of thin films, it is very beneficial to solve the problems concerning high-rate film formation and thermal load on substrates. The film formation rate has been increasing due to development of film formation sources such as evaporation sources and of substrate materials and due to improvement of techniques for cooling substrates. However, in order to achieve further cost reduction, a technique that allows production of high-quality thin films at a high rate is demanded.

The present disclosure provides a thin film production apparatus capable of reducing the thermal load imposed on a substrate during continuous production of thin films on the substrate and thereby producing high-quality thin films at a high rate while reducing thermal damage to the substrate.

The present disclosure provides a thin film production apparatus including:

a substrate feeding mechanism configured to continuously feed an elongated substrate or a plate substrate;

a substrate receiving mechanism configured to receive the elongated substrate or the plate substrate by winding the elongated substrate thereon or storing the plate substrate therein;

a substrate conveying mechanism configured to convey the substrate from the substrate feeding mechanism to the substrate receiving mechanism;

a film formation roller configured to allow a film to be formed directly on a roller circumferential surface of the roller;

a first film formation source configured to form a first thin film on a film formation surface of the substrate traveling on an upstream side of the film formation roller in a substrate conveyance direction along the substrate conveying mechanism; and a second film formation source configured to form a second thin film on the roller circumferential surface of the film formation roller, wherein the film formation roller is placed on a substrate conveyance route so that a surface of the second thin film formed on the roller circumferential surface of the film formation roller is joined in a face-to-face manner to a surface of the first thin film formed on the film formation surface of the substrate, the substrate receiving mechanism winds thereon or stores therein the substrate, the first thin film, and the second thin film detached from the film formation roller, which have been integrated together, and the second thin film is formed on the roller circumferential surface of the film formation roller to a greater thickness and/or at a higher deposition rate than the first thin film.

With the thin film production apparatus of the present disclosure, it is possible to reduce the thermal load imposed on a substrate during continuous production of thin films on the substrate and thereby produce high-quality thin films at a high rate while reducing thermal damage to the substrate.

BRIEF DESCRIPTION OF THE DRAWINGS

FIG. 13B is a longitudinal cross-sectional view of the heater of FIG. 13A;

DETAILED DESCRIPTION OF THE INVENTION

Figure 1:
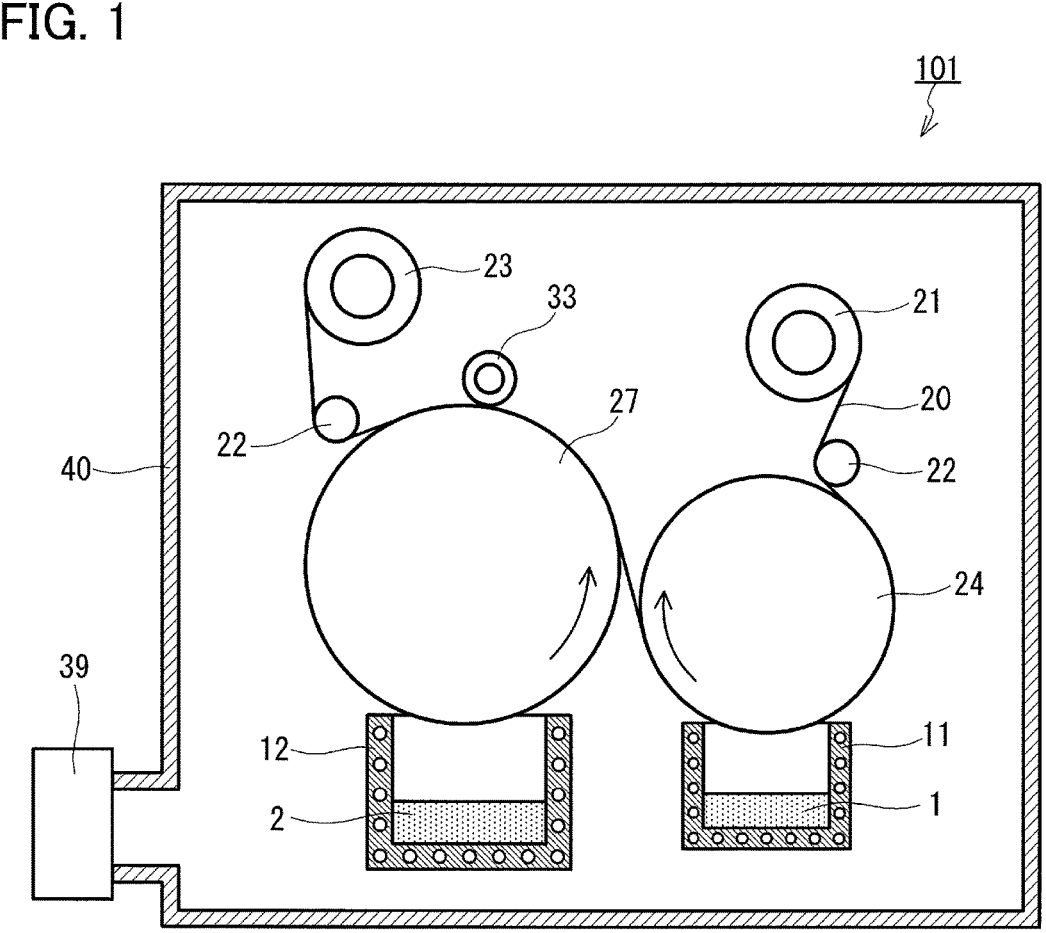
FIG. 1 is a schematic view showing an example of a configuration of a thin film production apparatus according to an embodiment of the present invention.

A first aspect of the present invention provides a thin film production apparatus including:

a substrate feeding mechanism configured to continuously feed an elongated substrate or a plate substrate;

a substrate receiving mechanism configured to receive the elongated substrate or the plate substrate by winding the elongated substrate thereon or storing the plate substrate therein;

a substrate conveying mechanism configured to convey the substrate from the substrate feeding mechanism to the substrate receiving mechanism;

a film formation roller configured to allow a film to be formed directly on a roller circumferential surface of the roller;

a first film formation source configured to form a first thin film on a film formation surface of the substrate traveling on an upstream side of the film formation roller in a substrate conveyance direction along the substrate conveying mechanism; and a second film formation source configured to form a second thin film on the roller circumferential surface of the film formation roller, wherein the film formation roller is placed on a substrate conveyance route so that a surface of the second thin film formed on the roller circumferential surface of the film formation roller is joined in a face-to-face manner to a surface of the first thin film formed on the film formation surface of the substrate, the substrate receiving mechanism winds thereon or stores therein the substrate, the first thin film, and the second thin film detached from the film formation roller, which have been integrated together, and the second thin film is formed on the roller circumferential surface of the film formation roller to a greater thickness and/or at a higher deposition rate than the first thin film.

In the thin film production apparatus according to the first aspect, the first thin film is formed on the substrate, and the second thin film is formed on the circumferential surface of the film formation roller. Thereafter, the surface of the first thin film and the surface of the second thin film are joined in a face-to-face manner so as to detach the second thin film from the film formation roller and integrate the first thin film and the second thin film together. In this manner, a thin film is formed on the substrate. When any conventional apparatus is used for producing thin films on a substrate, a thin film having an intended thickness is formed on the substrate, whereas when the thin film production apparatus according to the first aspect is used, it is only a portion (first thin film) corresponding to a part of the intended thickness that is formed on the substrate. Therefore, with the thin film production apparatus according to the first aspect, the amount of a film formation material vapor coming onto the substrate can be reduced in continuous production of thin films on the substrate. Accordingly, it is possible to reduce the thermal load, such as the condensation heat of the material vapor, which is imposed on the substrate during the film formation. In addition, a portion (second thin film) corresponding to the remaining part of the thickness of the thin film to be finally produced on the substrate is formed directly on the roller circumferential surface of the film formation roller. Since the film formation roller has a large heat capacity and, in addition, can be directly cooled unlike the substrate, thermal load by film formation does not pose a problem for the film formation roller. Therefore, with the thin film production apparatus according to the first aspect, the second thin film having high quality can be formed at a high rate even when the second thin film is formed on the roller circumferential surface of the film formation roller to a greater thickness and/or at a higher deposition rate than the first thin film. Thus, with the thin film production apparatus according to the first aspect, it is possible to produce high-quality films on a substrate at a high rate while reducing the thermal load imposed on the substrate.

A second aspect of the present invention provides the thin film production apparatus as set forth in the first aspect, wherein a single combined film formation source serves both as the first film formation source and as the second film formation source.

With the thin film production apparatus according to the second aspect, the equipment can be simplified, and the film formation can be carried out with a reduced number of components of the apparatus.

A third aspect of the present invention provides the thin film production apparatus as set forth in the first or second aspect, further including a junction-enhancement mechanism configured to enhance junction between the first thin film and the second thin film that are joined in a face-to-face manner.

With the thin film production apparatus according to the third aspect, more reliable junction between the first thin film and the second thin film can be achieved.

A fourth aspect of the present invention provides the thin film production apparatus as set forth in the third aspect, wherein the junction-enhancement mechanism is (A) a mechanism configured to provide at least one of heat and pressure to the first thin film and the second thin film that have been joined in a face-to-face manner, (B) a mechanism configured to emit an ultrasonic wave or a laser beam to the first thin film and the second thin film that have been joined in a face-to-face manner, or (C) an adhesive agent applying unit configured to apply an adhesive agent to the surface of the first thin film on the film formation surface of the substrate or to the surface of the second thin film on the roller circumferential surface of the film formation roller.

With the thin film production apparatus according to the fourth aspect, more reliable junction between the first thin film and the second thin film can easily be achieved.

A fifth aspect of the present invention provides the thin film production apparatus as set forth in any one of the first to fourth aspects, further including a release agent applying unit configured to apply a release agent to the roller circumferential surface of the film formation roller.

With the thin film production apparatus according to the fifth aspect, the second thin film can be more reliably detached from the film formation roller.

A sixth aspect of the present invention provides the thin film production apparatus as set forth in the fifth aspect, wherein the release agent is a liquid, and the release agent applying unit includes a mechanism configured to vaporize the release agent.

With the thin film production apparatus according to the sixth aspect, a release agent can be applied thinly and uniformly to the roller circumferential surface of the film formation roller, which further ensures the detachment of the second thin film from the film formation roller.

A seventh aspect of the present invention provides the thin film production apparatus as set forth in any one of the first to sixth aspects, wherein the first film formation source and the second film formation source are adapted to form thin films having the same composition.

With the thin film production apparatus according to the seventh aspect, high-quality thin films having a single composition can be produced at a high rate.

An eighth aspect of the present invention provides the thin film production apparatus as set forth in the seventh aspect, wherein the first film formation source and the second film formation source are adapted to form thin lithium films.

With the thin film production apparatus according to the eighth aspect, high-quality thin lithium films can be produced at a high rate.

A ninth aspect of the present invention provides a thin film production method for producing thin films on a substrate, including the steps of (I) forming a first thin film on a film formation surface of the substrate traveling along a substrate conveying mechanism;

(II) forming a second thin film on a roller circumferential surface of a film formation roller to a greater thickness and/or at a higher deposition rate than the first thin film, the film formation roller being configured to allow a film to be directly formed on the roller circumferential surface; and (III) joining a surface of the first thin film formed in the step (I) and a surface of the second thin film formed in the step (II) in a face-to-face manner so as to detach the second thin film from the film formation roller and integrate the second thin film with the first thin film.

In the thin film production method according to the ninth aspect, the first thin film is formed on the substrate, and the second thin film is formed on the circumferential surface of the film formation roller. Thereafter, the surface of the first thin film and the surface of the second thin film are jointed in a face-to-face manner so as to detach the second thin film from the film formation roller and integrate the first thin film and the second thin film together. In this manner, a thin film is formed on the substrate. When any conventional method is used for producing thin films on a substrate, a thin film having an intended thickness is formed on the substrate, whereas when the thin film production method according to the ninth aspect is used, it is only a portion (first thin film) corresponding to a part of the intended thickness that is formed on the substrate. Therefore, with the thin film production method according to the ninth aspect, the amount of a film formation material vapor coming onto the substrate can be reduced in continuous production of thin films on the substrate. Accordingly, it is possible to reduce the thermal load, such as the condensation heat of the material vapor, which is imposed on the substrate during the film formation. In addition, a portion (second thin film) corresponding to the remaining part of the thickness of the thin film to be finally produced on the substrate is formed directly on the roller circumferential surface of the film formation roller. Since the film formation roller has a large heat capacity and, in addition, can be directly cooled unlike the substrate, thermal load by film formation does not pose a problem for the film formation roller. Therefore, with the thin film production method according to the ninth aspect, the second thin film having high quality can be formed at a high rate even when the second thin film is formed on the roller circumferential surface of the film formation roller to a greater thickness and/or at a higher deposition rate than the first thin film.

Thus, with the thin film production method according to the ninth aspect, it is possible to produce high-quality films on a substrate at a high rate while reducing the thermal load imposed on the substrate.

A tenth aspect of the present invention provides the thin film production method as set forth in the ninth aspect, wherein both the first thin film and the second thin film are formed by a single combined film formation source.

With the thin film production method according to the tenth aspect, the equipment used can be simplified, which makes the film formation easier.

An eleventh aspect of the present invention provides the thin film production method as set forth in the ninth or tenth aspect, wherein the step (III) includes:

(a) providing at least one of heat and pressure to the first thin film and the second thin film that have been joined in a face-to-face manner; or (b) emitting an ultrasonic wave or a laser beam to the first thin film and the second thin film that have been joined in a face-to-face manner.

With the thin film production method according to the eleventh aspect, more reliable junction between the first thin film and the second thin film can easily be achieved.

A twelfth aspect of the present invention provides the thin film production method as set forth in any one of the ninth to eleventh aspects, further including a step of applying a release agent to the roller circumferential surface of the film formation roller prior to the step (II).

With the thin film production method according to the twelfth aspect, the second thin film can be more reliably detached from the film formation roller.

A thirteenth aspect of the present invention provides the thin film production method as set forth in the twelfth aspect, wherein the release agent is a liquid, and the release agent is vaporized and applied to the roller circumferential surface of the film formation roller.

With the thin film production method according to the thirteenth aspect, a release agent can be applied thinly and uniformly to the roller circumferential surface of the film formation roller, which further ensures the detachment of the second thin film from the film formation roller.

A fourteenth aspect of the present invention provides the thin film production method as set forth in any one of the ninth to thirteenth aspects, further including a step of applying an adhesive agent to the surface of the first thin film formed in the step (I) or to the surface of the second thin film formed in the step (II).

With the thin film production method according to the fourteenth aspect, more reliable junction between the first thin film and the second thin film can easily be achieved.

A fifteenth aspect of the present invention provides the thin film production method as set forth in any one of the ninth to fourteenth aspects, wherein at least one of the first thin film and the second thin film is a thin lithium film.

With the thin film production method according to the fifteenth aspect, high-quality thin lithium films can be produced at a high rate.

A sixteenth aspect of the present invention provides the thin film production method as set forth in any one of the ninth to fifteenth aspects, wherein the first thin film and the second thin film are thin films having the same composition.

With the thin film production method according to the sixteenth aspect, high-quality thin films having a single composition can be produced at a high rate.

A seventeenth aspect of the present invention provides an electrochemical device including:

a positive electrode plate including a positive electrode active material that absorbs or releases lithium ions;

a negative electrode plate including a negative electrode active material that releases or absorbs lithium ions; and a separator disposed between the positive electrode plate and the negative electrode plate and including an electrolyte having lithium ion conductivity, wherein the positive electrode plate, the negative electrode plate, and the separator form an electrode assembly by being overlaid on each other in such a manner that the separator is disposed between the positive electrode plate and the negative electrode plate and being wound or folded together, or the positive electrode plate, the negative electrode plate, and the separator form an electrode assembly by being laminated together in such a manner that the separator is disposed between the positive electrode plate and the negative electrode plate, a widthwise edge of the separator is located outwardly of a widthwise edge of at least one of the positive electrode plate and the negative electrode plate, and lithium is provided on a portion of at least one of a positive electrode plate-facing side and a negative electrode plate-facing side of the separator, the portion being in the vicinity of the widthwise edge of the separator and extending beyond the widthwise edge of the at least one of the positive electrode plate and the negative electrode plate.

In the case of an electrochemical device having an electrode assembly that is formed by overlaying electrode plates and a separator on each other and by winding or folding together the electrode plates and the separator or that is formed by laminating together electrode plates and a separator, misalignment in the width direction may occur in the electrode assembly. It is desirable that a high tension or a high voltage should not be applied when the electrode plates and the separator are wound, folded, or laminated together to fabricate the electrode assembly. In this case, however, misalignment in the winding, folding, or lamination is likely to occur. In an electrode assembly of the electrochemical device as set forth in the seventeenth aspect, however, separators having lithium provided in the vicinity of their widthwise edges face each other across an electrode plate, and the presence of the lithium serves to block slippage between the separators and the electrode plate, so that the occurrence of the misalignment in the width direction is reduced. In addition, the separators may be joined together partly at their widthwise edges with the aid of the lithium provided in the vicinity of their widthwise edges. In that case, the occurrence of misalignment in the width direction can be reduced even when the electrode assembly is formed with a low tension or a low voltage. The junction between the separators at their widthwise edges by means of the lithium may be achieved partly and naturally during the step of winding, folding, or lamination. Alternatively, the junction between the widthwise edges of the separators may be facilitated, for example, by gently pushing the edge face of the electrode assembly to bend those portions of the separators which extend beyond the electrode plate. The lithium provided on that portion of the separator which is located outwardly of the widthwise edge of the electrode plate does not contribute to charge and discharge, and thus often remains on the separator even after charge and discharge. Therefore, the lithium provided on the separator can be detected by disassembling the electrochemical device after charge and discharge.

An eighteenth aspect of the present invention provides a method for producing an electrochemical device including:
a positive electrode plate including a positive electrode active material that absorbs or releases lithium ions; a negative electrode plate including a negative electrode active material that releases or absorbs lithium ions; and a separator disposed between the positive electrode plate and the negative electrode plate and including an electrolyte having lithium ion conductivity, the method including the steps of:

(i) employing the thin film production method according to claim 9 in which a separator is used as the substrate and thin lithium films are formed as the first thin film and the second thin film, and thereby producing an electrochemical device separator including the separator as the substrate and a lithium layer formed on at least one principal surface of the separator;

(ii) producing an electrode assembly by overlaying a positive electrode plate including a positive electrode active material that absorbs or releases lithium ions, a negative electrode plate including a negative electrode active material that releases or absorbs lithium ions, and the electrochemical device separator obtained in the step (i) in such a manner that the electrochemical device separator is disposed between the positive electrode plate and the negative electrode plate, and then by winding or folding the positive electrode plate, the negative electrode plate, and the electrochemical device separator together, or producing an electrode assembly by laminating the positive electrode plate, the negative electrode plate, and the electrochemical device separator together in such a manner that the electrochemical device separator is disposed between the positive electrode plate and the negative electrode plate; and (iii) putting the electrode assembly in a casing and injecting an electrolyte having lithium ion conductivity into the casing.

For production of the electrode assembly of the electrochemical device, the production method according to the eighteenth aspect uses an electrochemical device separator including a lithium layer that has been previously formed using the thin film production method according to the ninth aspect. When an electrolyte is injected into a casing containing the electrode assembly produced using such an electrochemical device separator, the lithium of the lithium layer included in the electrochemical device separator is absorbed into the active material of the electrode plate. As a result, the volume of the electrode assembly becomes smaller than before the injection of the electrolyte. Therefore, it is not necessary to wind, fold, or laminate the electrode plates and the separator with a low tension or a low voltage taking into account the expansion and deformation of the electrode plates caused by repetition of charge and discharge of the electrochemical device and taking into account the possibility that the deformation of the device or the excessive force on the electrode plates occurs due to gas generation or the like. Thus, with the production method according to the eighteenth aspect, the deterioration of the electrochemical device can be prevented.

Hereinafter, embodiments of the present invention will be described in detail with reference to the drawings. The embodiments given below are only illustrative, and the present invention is not limited to the embodiments given blow. In the embodiments given below, the same components are denoted by the same reference characters, and the repeated description of the components may be omitted.

Embodiment 1

FIG. 1 is a schematic view showing an example of a configuration of a thin film production apparatus according to an embodiment of the present invention. A thin film production apparatus 101 shown in FIG. 1 is provided with: an unwinding roller (substrate feeding mechanism) 21 configured to continuously feed an elongated substrate 20; a winding roller (substrate receiving mechanism) 23 configured to receive the substrate 20 by winding the substrate thereon; and a substrate conveying mechanism configured to convey the substrate 20 from the unwinding roller 21 to the winding roller 23. The substrate conveying mechanism is constituted by a plurality of substrate conveying rollers 22 and a film formation supporting roller 24. The thin film production apparatus 101 is further provided with a film formation roller 27 configured to allow a film to be formed directly on its roller circumferential surface. In the present embodiment, the film formation supporting roller 24 and the film formation roller 27 function also as rollers for conveying the substrate. That is, the film formation supporting roller 24 and the film formation roller 27 rotate synchronously with the substrate 20 being conveyed. The thin film production apparatus 101 further includes a first film formation source 11 and a second film formation source 12. The first film formation source 11 is a film formation source for forming a first thin film on a film formation surface of the substrate 20 traveling on the upstream side of the film formation roller 27 in the substrate conveyance direction along the substrate conveying mechanism. The second film formation source 12 is a film formation source for forming a second thin film on the circumferential surface of the film formation roller 27. The film formation roller 27 is placed on the substrate conveyance route so that a surface of the second thin film formed on the circumferential surface of the film formation roller 27 is joined in a face-to-face manner to a surface of the first thin film formed on the film formation surface of the substrate 20. The second thin film is formed on the roller circumferential surface of the film formation roller 27 to a greater thickness and/or at a higher deposition rate than the first thin film. In the present embodiment, a case where the second thin film is formed to a greater thickness than the first thin film will be described as an example.

In the thin film production apparatus 101, the first thin film having a relatively small thickness is formed on the film formation surface of the substrate 20 first, and then the second thin film separately formed on the circumferential surface of the film formation roller 27 is transferred onto and integrated with the first thin film, so that a thin film having a desired thickness is formed on the substrate 20. Therefore, the substrate 20, the first thin film, and the second thin film detached from the film formation roller 27, which have been integrated with each other, are wound together on the winding roller 23.

The thin film production apparatus 101 is further provided with a pressure roller (junction-enhancement mechanism) 33 configured to apply, to the first thin film and the second thin film joined in a face-to-face manner, a pressure that is so directed as to bring the two films into close contact. With the pressure roller 33 applying a pressure that is so directed as to bring the first thin film and the second thin film into close contact, the first thin film and the second thin film are firmly joined. This makes it easier for the second thin film to be detached from the film formation roller 27, thus ensuring integration of the second thin film and the first thin film.

The unwinding roller 21, the winding roller 23, the substrate conveying mechanism (the substrate conveying roller 21 and the film formation supporting roller 24), the film formation roller 27, the first film formation source 11, the second film formation source 12, and the pressure roller 33, are disposed inside the vacuum chamber 40. The vacuum chamber 40 is a member in the form of a pressure-resistant container having an internal space. The vacuum chamber 40 is connected to an evacuation pump 39 provided outside the vacuum chamber 40, and the internal space is in a reduced pressure state adapted for formation of thin films. The evacuation pump 39 is composed of a vacuum pumping system including, for example, an oil diffusion pump, a cryopump, or a turbomolecular pump as a main pump. Thus, in the thin film production apparatus 101, the first thin film and the second thin film are formed under a vacuum, and then the first thin film and the second thin film are joined in a face-to-face manner under the vacuum. The surfaces of the first thin film and the second thin film formed under a vacuum are in an active state. In the thin film production apparatus 101, the first thin film and the second thin film are joined together, with such an active state maintained. That is, the active surface of the first thin film and the active surface of the second thin film are joined to each other. Thus, the first thin film and the second thin film can be firmly integrated. This effect is more marked especially when the first thin film and the second thin film are thin metal films.

The first film formation source 11 is a member in the form of an open-top container, and a specific example thereof is an evaporation container. A film formation material 1 is placed in the evaporation container. The first film formation source 11 is provided with a heating means. The film formation material 1 is heated by the heating means and thus evaporated. The vapor of the film formation material 1 moves vertically upward, passes through the opening of the first film formation source 11, and attaches to the film formation surface of the traveling substrate 20. Thus, the first thin film is formed on the film formation surface of the substrate 20. Also, the second film formation source 12 has the same configuration as the first film formation source 11, and a film formation raw material 2 is placed in an evaporation container. The vapor of the film formation raw material 2 heated and evaporated moves vertically upward, passes through the opening of the second film formation source 12, and attaches to the circumferential surface of the film formation roller 27 rotating synchronously with the substrate 20 being conveyed. Thus, the second thin film is formed directly on the circumferential surface of the film formation roller 27. The details of the configurations of the first film formation source 11 and the second film formation source 12 will be described later.

Figure 2:
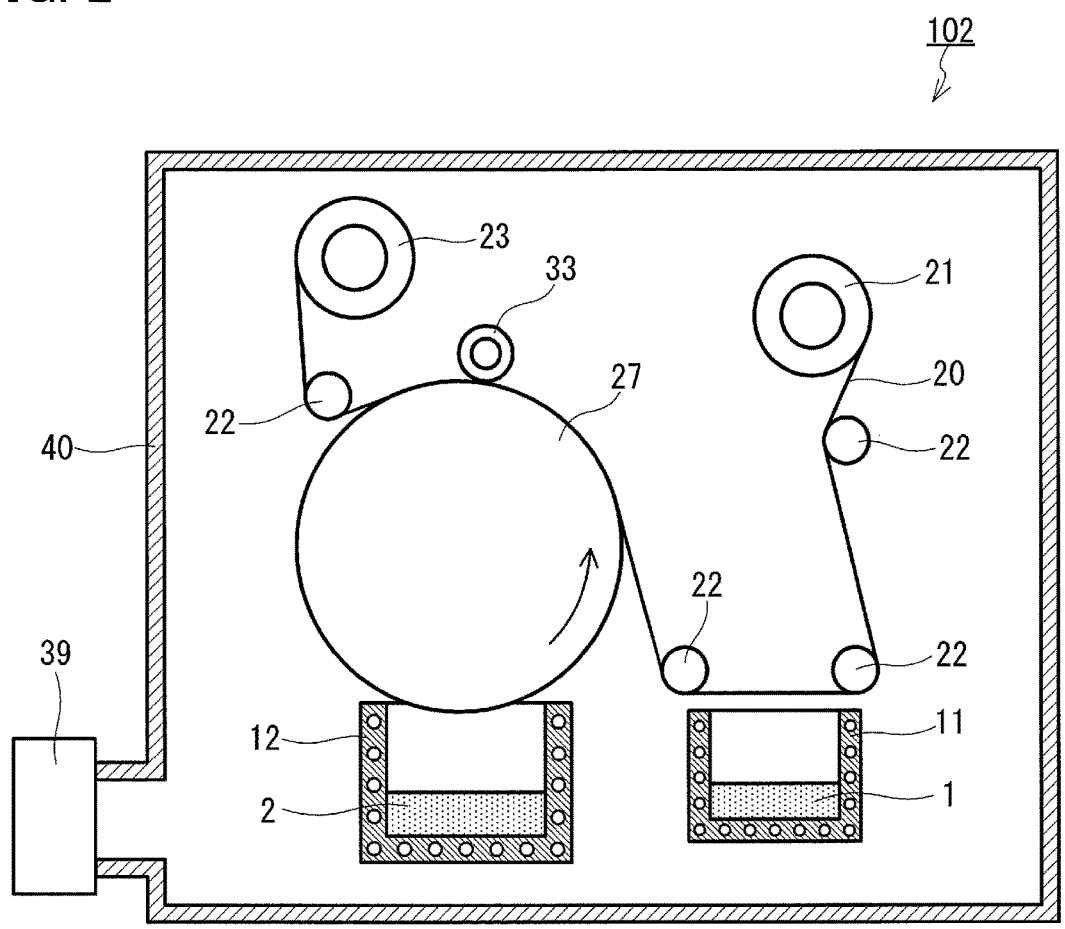
FIG. 2 is a schematic view showing another example of the configuration of the thin film production apparatus according to the embodiment of the present invention.

For example, rollers having a diameter of 15 to 150 mm can be used as the substrate conveying rollers 22. Rollers made of a metal such as iron, aluminum, copper, or stainless steel, rollers made of such a metal and having a surface covered with any type of plating film or with another covering material, or rollers made of any type of resin, can be used as the substrate conveying rollers 22. The substrate conveying rollers 22 are not limited to these types of rollers as long as they are capable of conveying the substrate 20. In a first film formation section where the first thin film is formed on the film formation surface of the substrate 20 facing the opening of the first film formation source 11, the substrate 20 may be supported merely on the conveying rollers 22 instead of being supported on the film formation supporting roller 24, as in the case of a thin film production apparatus 102 shown in FIG. 2. Also, in the first film formation section, the substrate 20 may be supported on a circulating film formation supporting belt 25 as in the case of a thin film production apparatus 103 shown in FIG. 3. In terms of preventing thermal damage to the substrate 20, it is more preferable that, in the first film formation section, the substrate 20 be supported on the film formation supporting roller 24 or the film formation supporting belt 25, because in this case the thermal load imposed on the substrate 20 in the first film formation section can be transferred to the support which is a roller or a belt.

Various plastics, paper, metal foils, etc. can be used as the material of the substrate 20. In particular, when the substrate 20 is an insulator, the heat applied to the substrate 20 in the first film formation section can be quickly transferred to the support which is a roller or a belt by bringing the substrate 20 into close contact with the support. Therefore, as in the case of a thin film production apparatus 104 shown in FIG. 4, the substrate 20 and the film formation supporting roller 24 may be clamped to each other with an electrostatic chuck by using a current carrying roller 26. In order to obtain the same effect, the substrate 20 and the film formation supporting roller 24 may be clamped to each other with an electrostatic chuck by using an electron beam source 31 to generate electron beams 32 and irradiate the substrate 20 with electrons, as in the case of a thin film production apparatus 105 shown in FIG. 5. Such techniques using an electrostatic chuck can be applied also to a configuration using the film formation supporting belt 25 (see FIG. 3).

Figure 4:
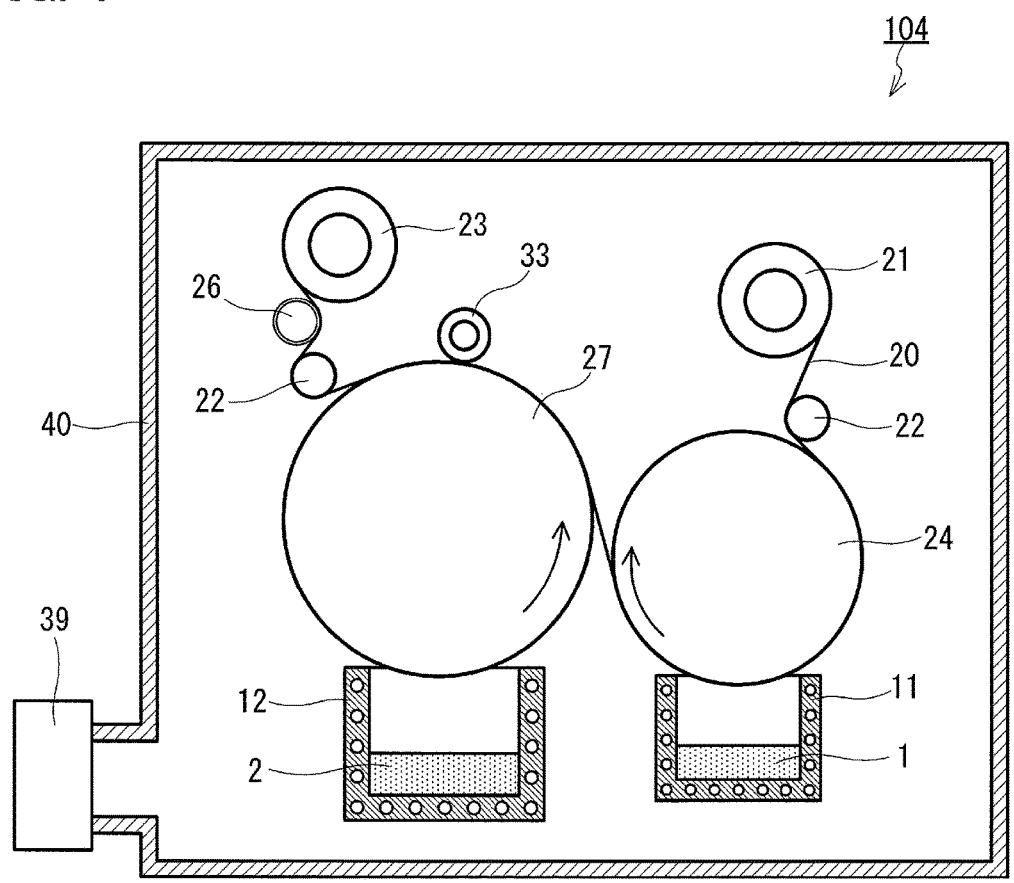
FIG. 4 is a schematic view showing still another example of the configuration of the thin film production apparatus according to the embodiment of the present invention.
Figure 5:
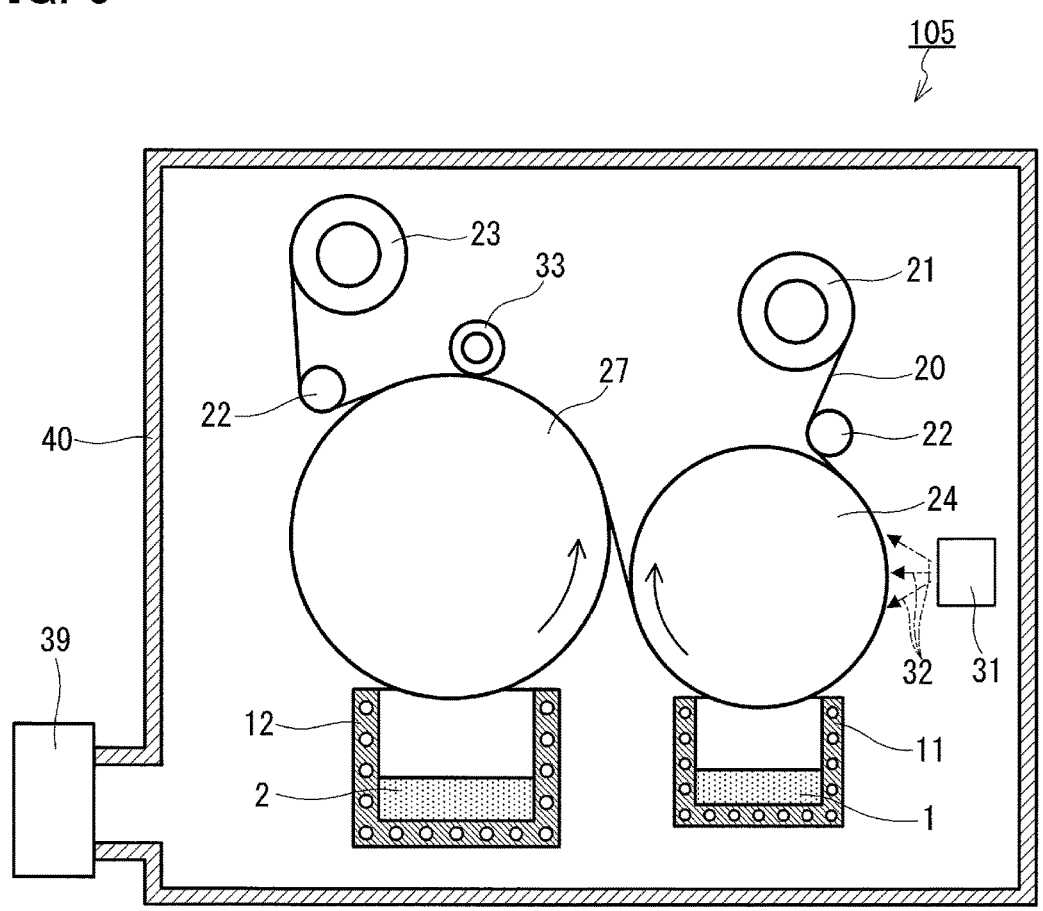
FIG. 5 is a schematic view showing still another example of the configuration of the thin film production apparatus according to the embodiment of the present invention.
Figure 6:
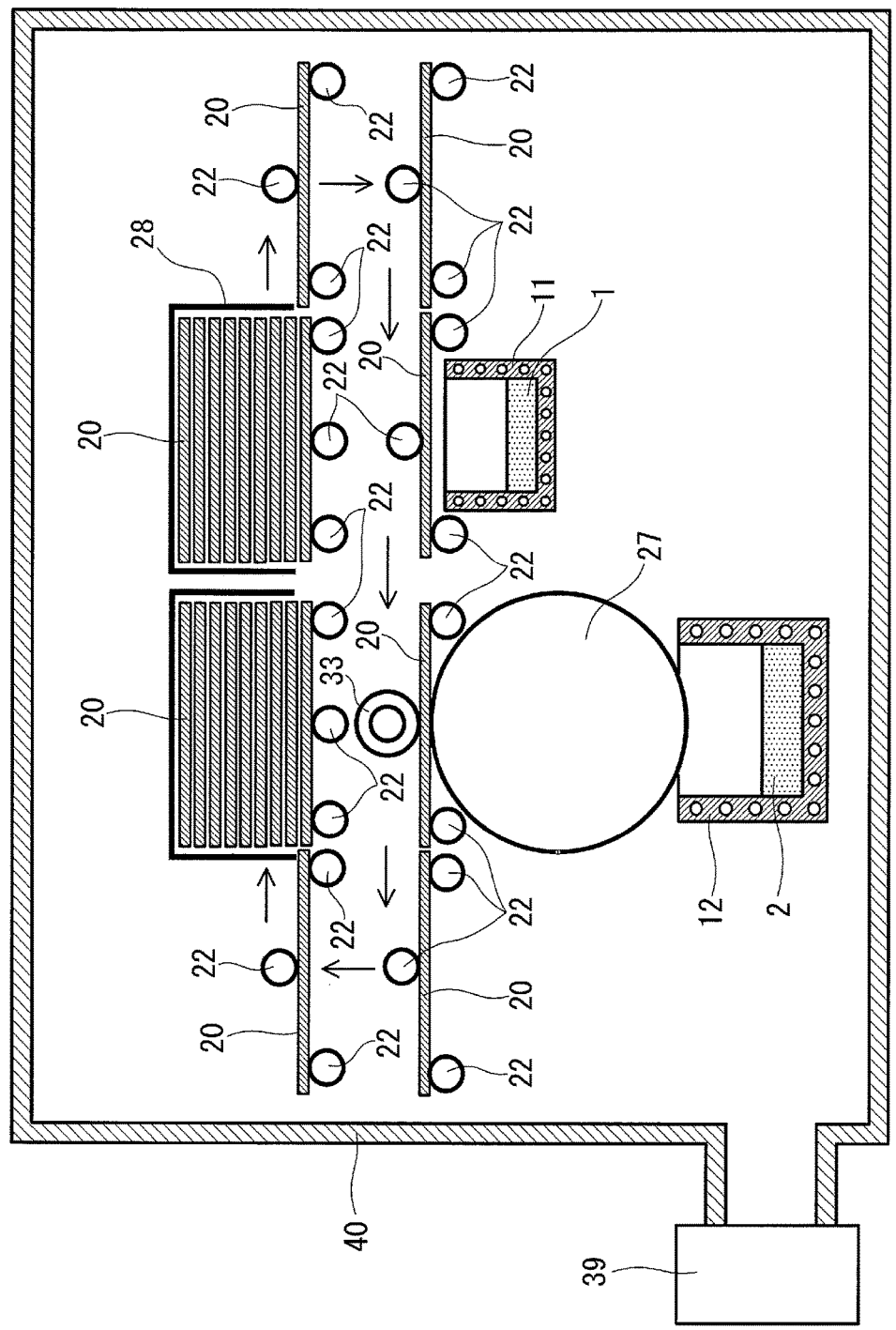
FIG. 6 is a schematic view showing still another example of the configuration of the thin film production apparatus according to the embodiment of the present invention.

The thin film production apparatuses 101 to 105 shown in FIG. 1 to FIG. 5 each have a configuration that uses an elongated substrate as the substrate 20, uses the unwinding roller 21 as the substrate feeding mechanism, and uses the winding roller 23 as the substrate receiving mechanism. However, the technical features of the thin film production apparatuses of the present embodiment can be applied also to an apparatus using plate substrates; that is, an apparatus for producing a thin film on each plate substrate can be configured to form the first thin film on the substrate and join the first thin film with the second thin film separately formed on the circumferential surface of the film formation roller 27 so as to integrate the two films. In this case, as in the case of a thin film production apparatus 106 shown in FIG. 6, a substrate conveying mechanism can be employed in which plate substrates 20 are consecutively fed from a feeding stocker (substrate feeding mechanism) 28, these substrates 20 are conveyed along a plurality of conveying rollers 20, and the plate substrates 20 are stored into a receiving stocker (substrate receiving mechanism) 29. Also in the thin film production apparatus 106, the first film formation source 11 is placed so as to face the film formation surface of the substrate 20 traveling on the upstream side of the film formation roller 27 in the substrate conveyance direction along the substrate conveying mechanism. In addition, the second film formation source 12 is placed so as to face the circumferential surface of the film formation roller 27 in order to form the second thin film on the circumferential surface of the film formation roller 27. In addition, the film formation roller 27 is placed so that a surface of the second thin film formed on the circumferential surface of the film formation roller 27 is joined in a face-to-face manner to a surface of the first thin film formed on the film formation surface of the substrate 20.

In the thin film production apparatuses 101 to 106 shown in FIG. 1 to FIG. 6, the vapor of the film formation raw material 2 from the second film formation source 12 is formed into the second thin film on the circumferential surface of the film formation roller 27 rotating synchronously with the substrate 20. The second thin film is formed on the circumferential surface of the film formation roller 27, and is joined in a face-to-face manner to the first thin film formed on the substrate 20. For example, a roller having a diameter of 200 to 1500 mm can be used as the film formation roller 27. A roller made of a metal such as iron, aluminum, copper, or stainless steel, a roller made of such a metal and having a surface covered with any type of plating film or with another covering material, or a roller made of any type of resin, can be used as the film formation roller 27. In the case where the roller surface of the film formation roller 27 is formed by a resin, Delrin, Duracon, Solidur, or PEEK (polyetheretherketone) can be used as the material of the surface, for example. Among these, Delrin and Duracon can be preferably used, and Delrin can be most preferably used. Resins that can be used when the surface of the film formation roller 27 is formed by a resin are not limited to the above-mentioned resins. Resins that are poorly reactive with lithium and are highly heat resistant can be suitably used. Instead of forming only the circumferential surface of the film formation roller 27 by a resin, it is possible to form the entire film formation roller by a resin. The material of the surface of the film formation roller 27 can be selected depending on, for example, the materials of the substrate 20, the first thin film, and the second thin film so as to ensure that, when the substrate 20 moves away from the circumferential surface of the film formation roller 27 after the first thin film formed on the substrate 20 and the second thin film formed on the circumferential surface of the film formation roller 27 are joined in a face-to-face manner, the second thin film transfers to the substrate 20 by being peeled from the circumferential surface of the film formation roller 27 and accompanying the first thin film. The thin film production apparatuses 101 to 105 have a configuration in which the film formation roller 27 serves also as a roller for conveying the substrate 20, but this configuration is not limiting. For example, the thin film production apparatuses 101 to 105 can also have a configuration in which the substrate 20 travels along the pressure roller 33 so that the film formation roller 27 and the first thin film formed on the substrate 20 come into line contact (a configuration in which the holding angle of the substrate 20 is 0 degrees). Also with such a configuration, the same effects as those provided by the above-described thin film production apparatuses 101 to 105 can be achieved.

In order to further ensure the junction between the first thin film and the second thin film in a state where the surface of the first thin film formed on the substrate 20 faces the surface of the second thin film on the film formation roller 27, it is desirable to use a mechanism (junction-enhancement mechanism) for enhancing the junction between the first thin film and the second thin film. The junction-enhancement mechanism is not particularly limited as long as the qualities of the substrate 20 and the thin films formed are not degraded. One example thereof is the pressure roller 33 provided in the thin film production apparatus 101 shown in FIG. 1. For example, a rubber roller having a diameter of 30 to 150 mm can be used as the pressure roller 33. For example, nitrile rubber, Viton rubber, silicone rubber, or any other type of rubber, can be used as the rubber of the rubber roller.

Figure 7:
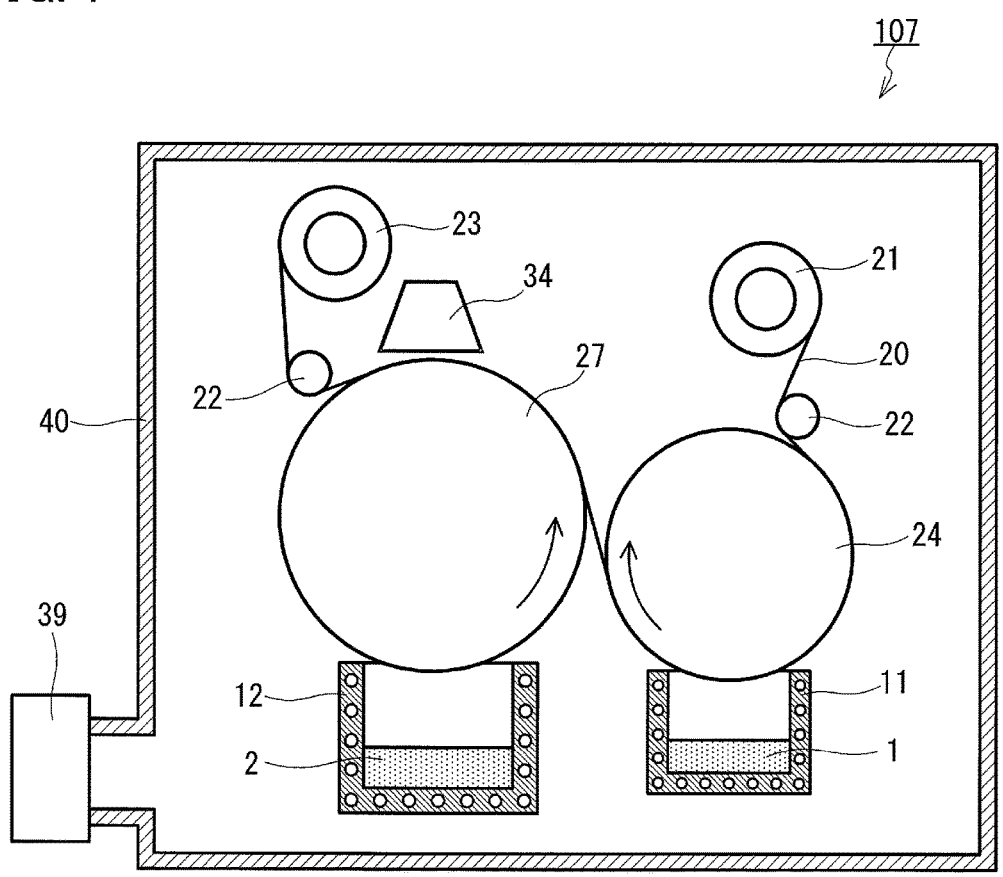
FIG. 7 is a schematic view showing still another example of the configuration of the thin film production apparatus according to the embodiment of the present invention.

As another example of the junction-enhancement mechanism, a warming device 34 can be used as in the case of a thin film production apparatus 107 shown in FIG. 7. For example, a heater can be used as the warming device 34. Depending on the materials of the substrate 20, the first thin film, and the second thin film, the warming device 34 can be selected as appropriate from among a far-infrared heater, an infrared heater, a halogen lamp, an induction heating device, and the like.

Figure 8:
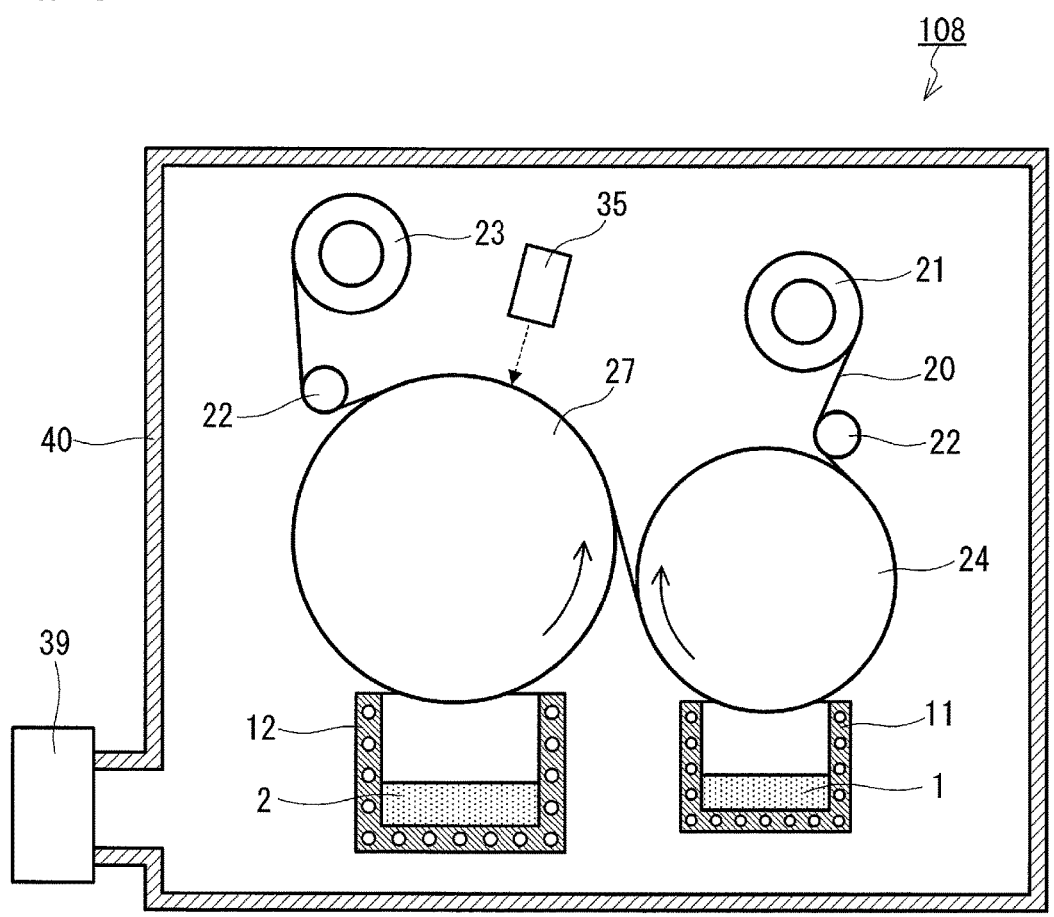
FIG. 8 is a schematic view showing still another example of the configuration of the thin film production apparatus according to the embodiment of the present invention.

As still another example of the junction-enhancement mechanism, a laser 35 can be used as in the case of a thin film production apparatus 108 shown in FIG. 8. For example, in the case where the substrate 20 is a PET (Polyethylene terephthalate) substrate and both the first thin film and the second thin film are thin metal films, a YAG laser is used so that a laser beam transmitted through the substrate 20 allows the first thin film and the second thin film to be fused and joined. The laser beam may be emitted continuously or discretely. Providing spot welding points in a lattice pattern further ensures that the junction between the first thin film and the second thin film over their entire surfaces is achieved.

Figure 9:
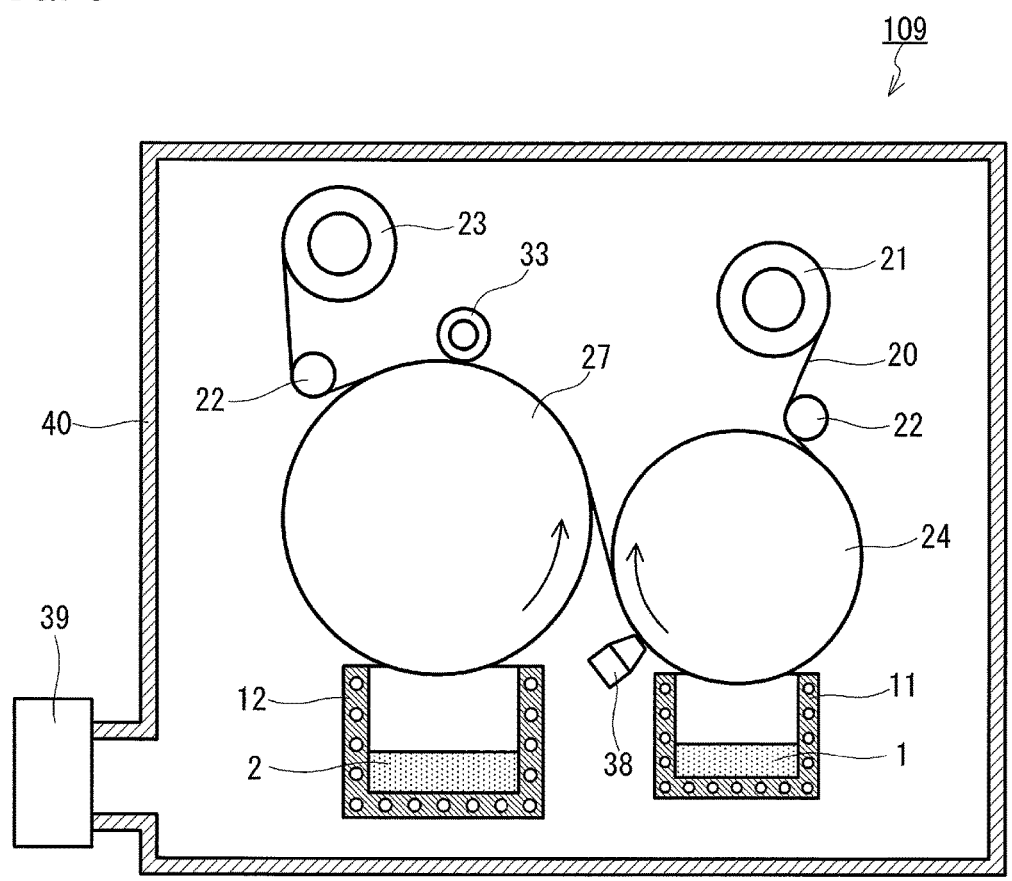
FIG. 9 is a schematic view showing still another example of the configuration of the thin film production apparatus according to the embodiment of the present invention.

As still another example of the junction-enhancement mechanism, an adhesive agent applying unit 38 that is placed between the first film formation section and a section for joining the first thin film and the second thin film and that is configured to apply an adhesive agent to the surface of the first thin film or the surface of the second thin film can also be used as in the case of a thin film production apparatus 109 shown in FIG. 9. The technique employed in the adhesive agent applying unit 38 for application of the adhesive agent can be selected as appropriate from among coating techniques such as reverse coating, gravure coating, die coating, and ink jet coating, depending on the type of the adhesive agent used. A tacky material other than common adhesive agents can also be used.

The junction-enhancement mechanism is not particularly limited, and may be a mechanism using another technique such as a mechanism using ultrasonic irradiation, as long as the junction between the first thin film and the second thin film is improved.

Figure 10:
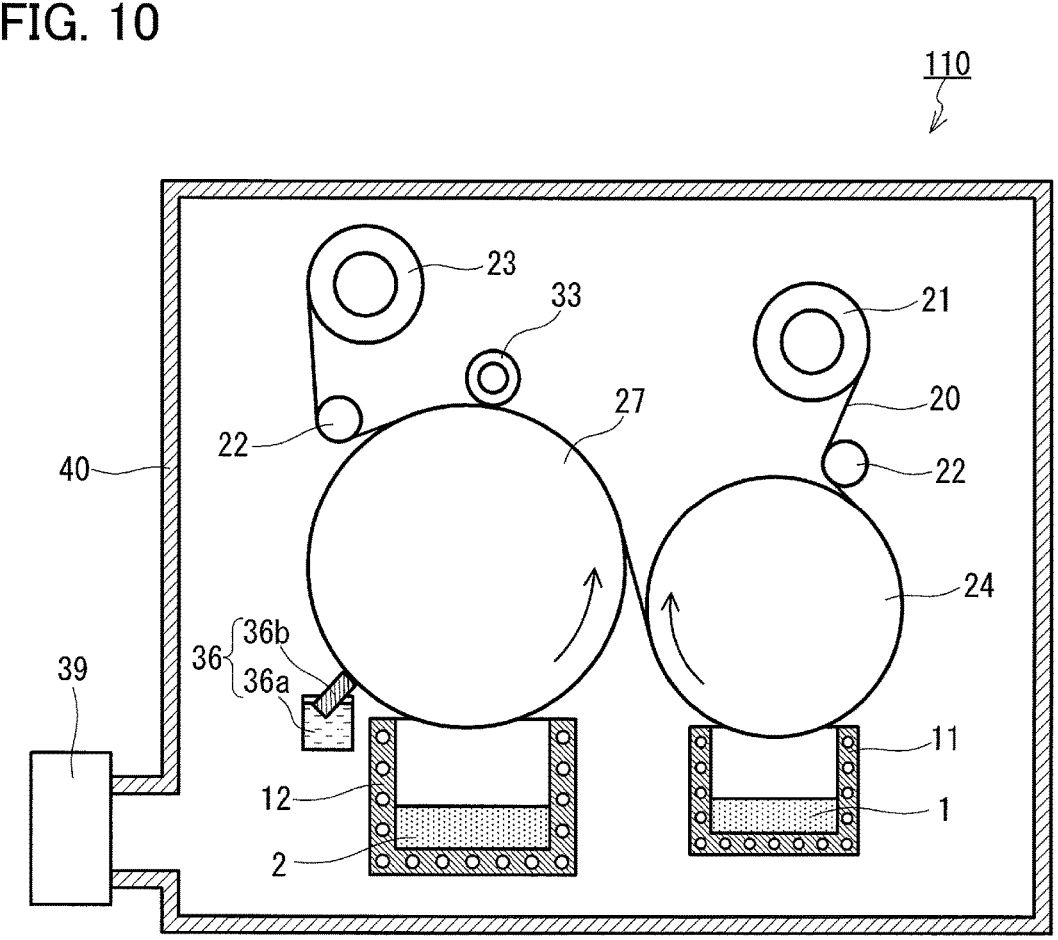
FIG. 10 is a schematic view showing still another example of the configuration of the thin film production apparatus according to the embodiment of the present invention.

In order to improve the detachability of the second thin film from the film formation roller 27, it is effective to apply a release agent to the circumferential surface of the film formation roller 27. It is desirable to use any type of oil, a fluorine-based release agent, or a silicone-based release agent as the release agent. When an oil is used, it is desirable, in terms of maintaining vacuum, that the oil should not contain a large amount of a component having a significantly lower boiling point than the main oil component. It is more desirable to use a synthetic oil such as Fomblin than to use a mineral oil. Therefore, as in the case of a thin film production apparatus 110 shown in FIG. 10, an applicator 36 may be provided as a release agent applying unit for applying a release agent to the circumferential surface of the film formation roller 27. The applicator 36 shown in FIG. 10 is constituted by a release agent retaining container 36a retaining a release agent and a porous impregnated chip 36b that is in contact with the circumferential surface of the film formation roller 27. A resin, a metal, a ceramic, or a composite thereof can be used in the porous impregnated chip 36b. With this applicator, the second thin film is formed after the release agent soaked into the impregnated chip 36b from the release agent retaining container 36a by capillary action is applied to the circumferential surface of the film formation roller 27. Therefore, the second thin film can be peeled successfully and transferred from the film formation roller 27 to the first thin film. The method for applying the release agent to the circumferential surface of the film formation roller 27 is not limited to the method using the applicator 36. Other methods such as reverse coating, gravure coating, and die coating, can also be used.

Figure 11:
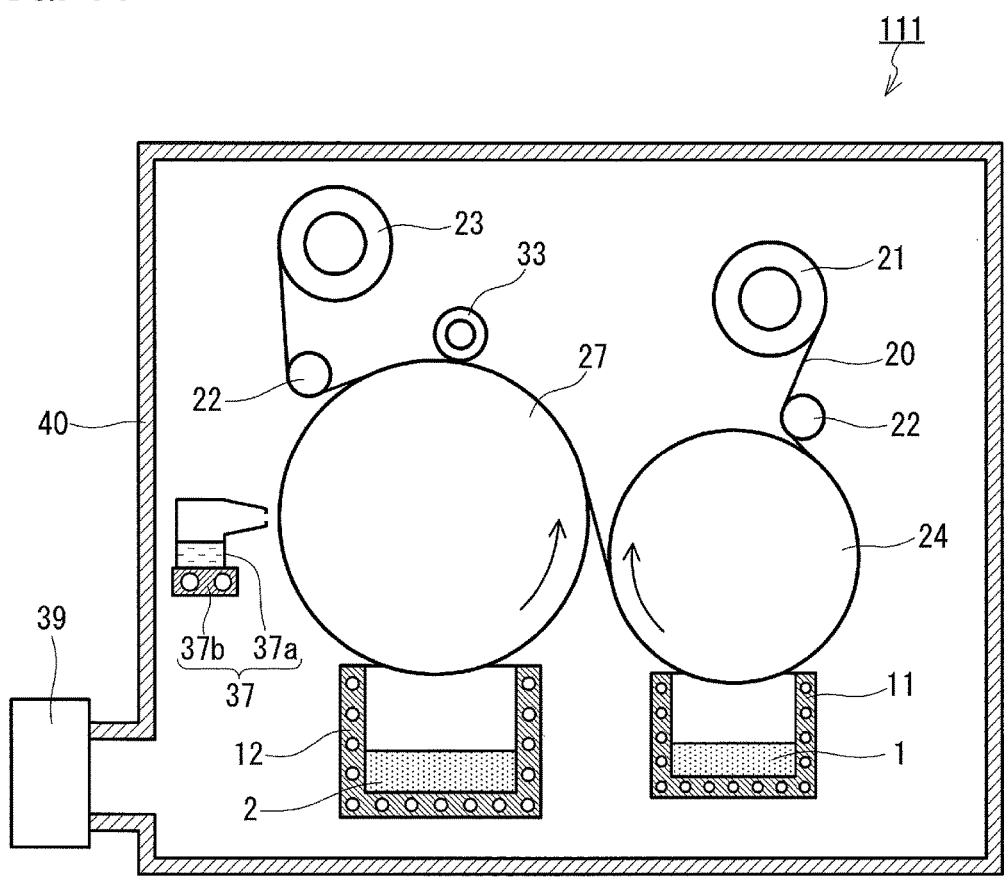
FIG. 11 is a schematic view showing still another example of the configuration of the thin film production apparatus according to the embodiment of the present invention.

Another example of the release agent applying unit for applying a release agent to the circumferential surface of the film formation roller 27 is an evaporator configured to apply a release agent in the form of a vapor. As in the case of a thin film production apparatus 111 shown in FIG. 11, an evaporator 37 may be disposed as the release agent applying unit. The evaporator 37 is constituted by a release agent retaining container 37a having an opening and a release agent heating means 37b. As the heating method used in the release agent heating means 37b, rod heating, plate heating, optical heating, induction heating, or any other type of heating method, can be employed. The evaporator 37 is not in contact with the film formation roller 27, and therefore has no parts subject to abrasion. Accordingly, a release agent can be applied stably for a long period of time. In addition, by adjusting the heating temperature, it is possible to adjust, for example reduce, the thickness of the release agent applied to the circumferential surface of the film formation roller 27. This can minimize the amount of the release agent attached to the thin film to be produced finally on the substrate 20.

Figure 12A:
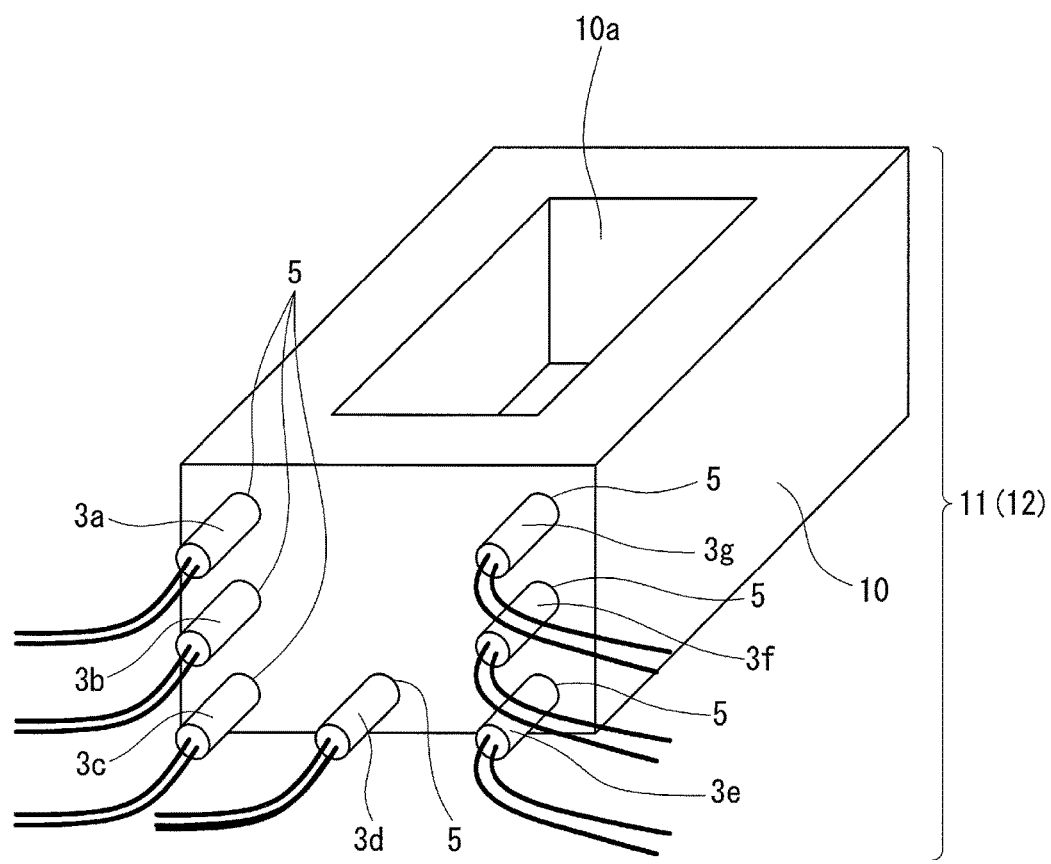
FIG. 12A is a perspective view schematically showing an example of a configuration of a film formation source.
Figure 12B:
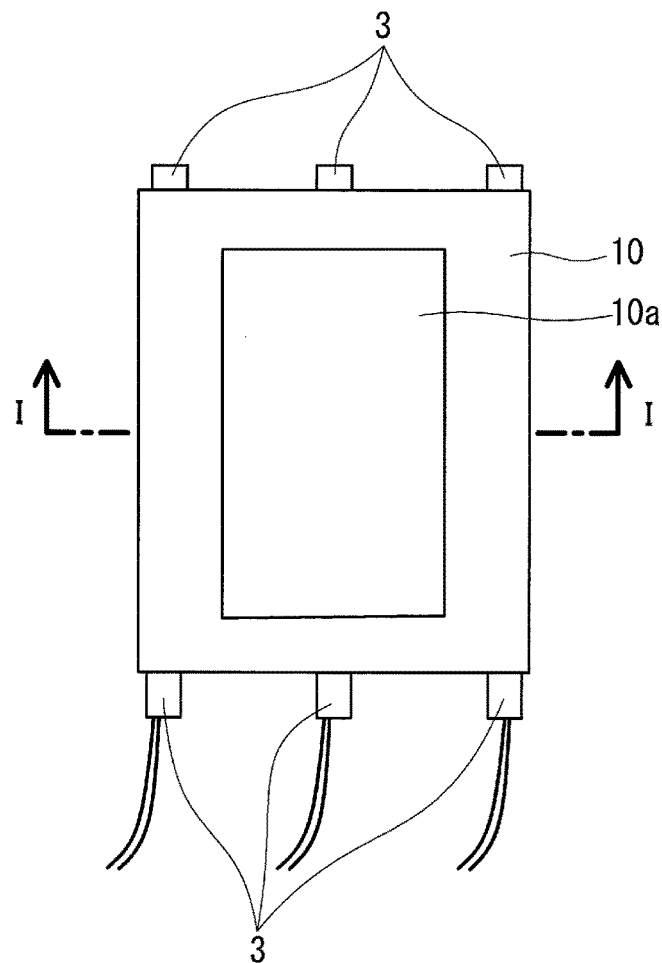
FIG. 12B is a schematic view of the top face of the film formation source of FIG. 12A.
Figure 12C:
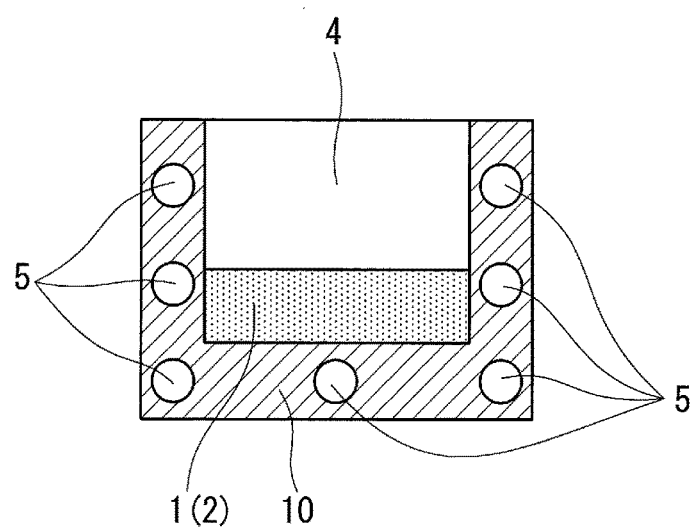
FIG. 12C is a schematic view of a cross-section taken along I-I line of FIG. 12B.

Next, the configuration of the first film formation source 11 and the second film formation source 12 will be described. FIG. 12A to FIG. 12C show an example of the configuration of the film formation sources 11 and 12 used in the thin film production apparatuses 101 to 111. FIG. 12A is a perspective view of the film formation source 11 or 12, FIG. 12B is a schematic view of the top face of the film formation source 11 or 12, and FIG. 12C is a schematic view of a cross-section taken along I-I line of FIG. 12B.

The film formation sources 11 and 12 each include: a heating block 10 that is a member in the form of an open-top container; and a plurality of rod-shaped heaters 3 (3a to 3e) serving as heating means. The heating block 10 is an evaporation container having a material holding portion 10a containing the film formation material 1 or the film formation raw material 2 to be evaporated. The heating block 10 is heated by passing a current through the heaters 3. By heating the heating block 10 with the heaters 3, the film formation material 1 or the film formation raw material 2 contained in the material holding portion 10a can be melted and evaporated.

When the film formation sources 11 and 12 as shown in FIGS. 12A to 12C are disposed respectively in the proximity of the film formation supporting roller 24 and the film formation roller 27 as in the case of, for example, the thin film production apparatus 101 shown in FIG. 1, the film formation material 1 and the film formation raw material 2 that have been evaporated can be effectively formed into thin films. When, as in this case, the vapor obtained from the film formation material 1 or the film formation raw material 2 as a result of heating of the heating block 10 is used in the state where the opening of the material holding portion 10a holding the film formation material 1 or the film formation raw material 2 is located close to the film formation position on the substrate 20 or the film formation roller 27, the material can be formed into a film with high material use efficiency. A film formation source having such a configuration (a configuration having an opening in a part of a container and designed to allow the opening to be located close to and face the film formation position) is referred to as a nozzle-type film formation source. This type of film formation source is excellent in productivity and maintainability, and is particularly advantageous in forming a film using a low-melting-point material.

Insertion holes 5 are formed in the heating block 10. The heaters 3 (3a to 3e) having a cylindrical shape are inserted in the insertion holes 5. The heating block 10 is heated by passing a current through the heaters. It is desirable that the relation between the diameter of the insertion holes 5 and the diameter of the heaters 3 be selected so that insertion and removal of the heaters 3 accompanying repeated heating can easily be done. Specifically, when the heaters 3 have a diameter of 5 to 15 mm, for example, the insertion holes 5 having a diameter that is 0.05 mm to 0.5 mm greater than that of the heaters 3 are formed. In order to facilitate the heating of the heating block 10, it is desirable that the difference between the diameter of the insertion holes 5 and the diameter of the heaters 3 be as small as possible to the extent that insertion and removal of the heaters 3 accompanying repeated heating can easily be done.

Figure 13A:
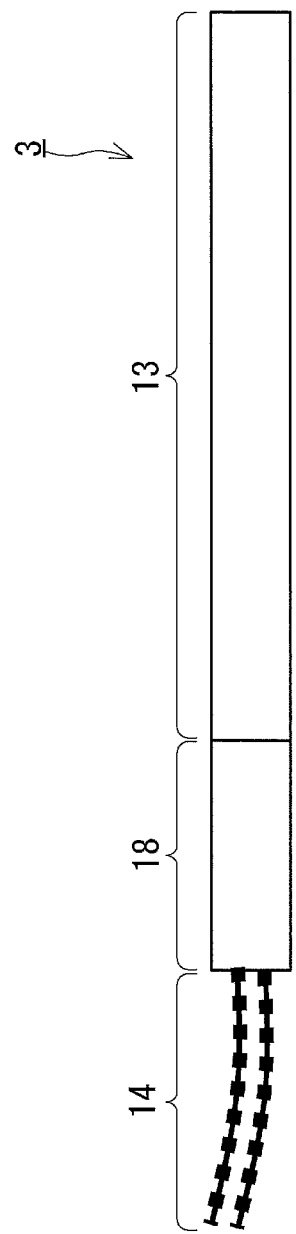
FIG. 13A is a schematic view showing an example of a configuration of a heater.

For example, the heater 3 has a structure as shown in FIG. 13A, and is composed of a heater portion 13, a lead portion 14, and a connection portion 18 connecting the portions 13 and 14. As shown in FIG. 13B, the heater portion 13 is constituted by a heating element 15, an insulating material 16a, and an outer casing 17 of the heater. In the heater portion 13, the space between the outer casing 17 of the heater and the heating element 15 formed by winding or the like of heater wires 7 is filled with the insulating material 16a. Lead wires 8 in the lead portion 14 have insulating protectors 9 each surrounding a part of the lead wire 8 and made of glass fibers or a ceramic insulator. In the connection portion 18, the lead wires 8 are connected to the ends of the heater wires 7 at connection points 19. In the connection portion 18, the space between the outer casing 17 and the current-carrying portion including the connection points 19 is filled with an insulating material 16b.

The connection portion 18 does not need to have the outer casing 17 or the insulating material 16b, and can be used as long as it is covered with an insulating material. However, with the connection portion 18 having the outer casing 17 and the insulating material 16b, the mechanical robustness in the vicinity of the connection points can be improved, and wire breakage due to concentration of stresses can be prevented. In addition, when the diameter of the outer casing 17 in the connection portion 18 is set equal to the diameter of the outer casing 17 in the heater portion 13, the heater 3 is easy to handle. In order to avoid excessive increase in the temperatures of the connection points 19 and the lead wires 8, it is desirable not to insert the connection portion 18 into the insertion hole 5 of the heating block 10.

The configuration of the heater 3 shown in FIGS. 13A and 13B is only illustrative, and the heater 3 is not limited to this configuration.

The film formation material 1 or the film formation raw material 2 placed in the material holding portion 10a is heated indirectly by the heaters 3, and the vapor of the film formation material 1 or the film formation raw material 2 is discharged through the opening of the heating block 10, so that a film is formed on the traveling substrate 10 or the circumferential surface of the rotating film formation roller 27 that is situated facing the opening of the heating block 10.

It is desirable that the inner wall of the heating block 10 be warmed to the degree that almost none of the material attaches to the inner wall. Examples of other heating means that can be used for heating the heating block 10 include, but not limited to, a cartridge heater, a planar heater, an optical heating device, and an induction heating device. As a film formation source, for example, an electron beam evaporation source as exemplified by the first film formation source 11 of a thin film production apparatus 112 shown in FIG. 14 can be used instead of the nozzle-type film formation source. In the case where a resin monomer is used as the film formation material 1, it is effective to employ a configuration in which a polymerization unit 42 is disposed as in the case of a thin film production apparatus 113 shown in FIG. 15. A device employing a technique such as ultraviolet curing, thermal curing, or electron beam curing, can be used as the polymerization unit 42. Furthermore, a polymerization initiator may be added to the film formation material 1 as necessary.

Figure 16:
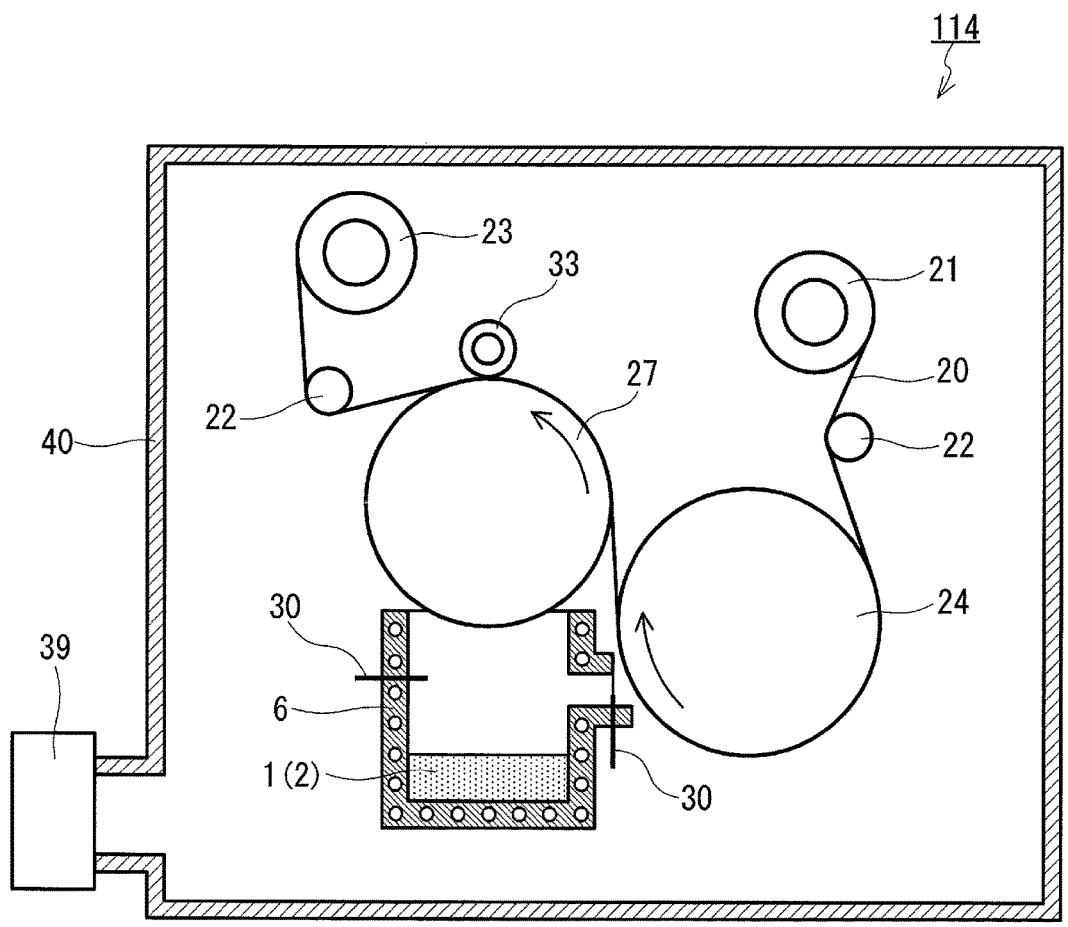
FIG. 16 is a schematic view showing still another example of the configuration of the thin film production apparatus according to the embodiment of the present invention.

FIG. 16 shows a thin film production apparatus 114 having a configuration in which a single combined film formation source serves both as the first film formation source 11 and as the second film formation source 12, that is, a configuration in which the first film formation source 11 and the second film formation source 12 are integrated as a combined film formation source 6 and in which film formation is carried out using one and the same material. The use of only a single film formation source can lead to simplification of the equipment. In the case of using the thin film production apparatus 114, the first thin film and the second thin film to be formed have the same composition.

The control of the thicknesses of the first thin film and the second thin film can be done by changing the conductance of the film formation source to the first film formation section and the conductance of the film formation source to the second film formation section (the section where the second thin film is formed). In the case where the first film formation source 11 and the second film formation source 12 are independent of each other, the amount of the film to be formed can be controlled by monitoring the amount of the formed film and adjusting the temperature of each film formation source. In the case where the first film formation source 11 and the second film formation source 12 are integrated together, that is, in the case of the thin film production apparatus 114 shown in FIG. 16, changing the temperature of the film formation source disadvantageously results in simultaneous changes in the thicknesses of both the first thin film and the second thin film. Therefore, in the case where the first film formation source 11 and the second film formation source 12 are integrated together, it is desirable that, for example, regulating plates 30 be provided for the two openings of the combined film formation source 6 as schematically shown in FIG. 16, and the thicknesses of the first thin film and the second thin film be controlled by displacing these regulating plates 30. The thicknesses of the first thin film and the second thin film can be controlled based on the two parameters, that is, the positions of the regulating plates 30 and the temperature of the film formation source.

One of the characteristics of a thin film produced by the thin film production apparatuses 101 to 114 of the present embodiment lies in that, when the film formation material 1 and the film formation raw material 2 are the same metal material, the resulting film is a single-composition film as a whole but a slight oxidized layer or the like is likely to be formed at the junction plane between the first thin film and the second thin film. Both the first thin film and the second thin film are formed under a vacuum; however, in the case where an extremely-thin reaction layer is formed on the surface of the first and/or second film as a result of reaction with the remaining gas, the films are joined to each other with the reaction layer enclosed. In the case where there is a large amount of the remaining gas, that is, where ultrahigh vacuum is not secured or in the case where the metal material is highly reactive, the reaction layer is particularly likely to be formed. In the case where both the first thin film and the second thin film have a thick reaction layer, the junction may be adversely affected. However, with the thin film production apparatuses 101 to 114 of the present embodiment, the two films can be joined together even in the presence of a certain thickness of reaction layers. These reaction layers can be detected by depth profile analysis using Auger electron spectroscopy (AES), electron spectroscopy for chemical analysis (ESCA), secondary ion mass spectrometry (SIMS) or the like.

With the thin film production apparatuses 101 to 114 of the present embodiment, the below-described thin film production method of the present embodiment can be carried out. That is, the use of the thin film production apparatuses 101 to 114 makes it possible to carry out a thin film production method including the steps of (I) forming a first thin film on a film formation surface of a substrate traveling along a substrate conveying mechanism;

(II) forming a second thin film on a roller circumferential surface of a film formation roller to a greater thickness and/or at a higher deposition rate than the first thin film, the film formation roller being configured to allow a film to be directly formed on the roller circumferential surface; and (III) joining a surface of the first thin film formed in the step (I) and a surface of the second thin film formed in the step (II) in a face-to-face manner so as to detach the second thin film from the film formation roller and integrate the second thin film with the first thin film.

Next, specific examples of the combination of the thin film production apparatus and the thin film production method of the present embodiment will be described.

Figure 14:
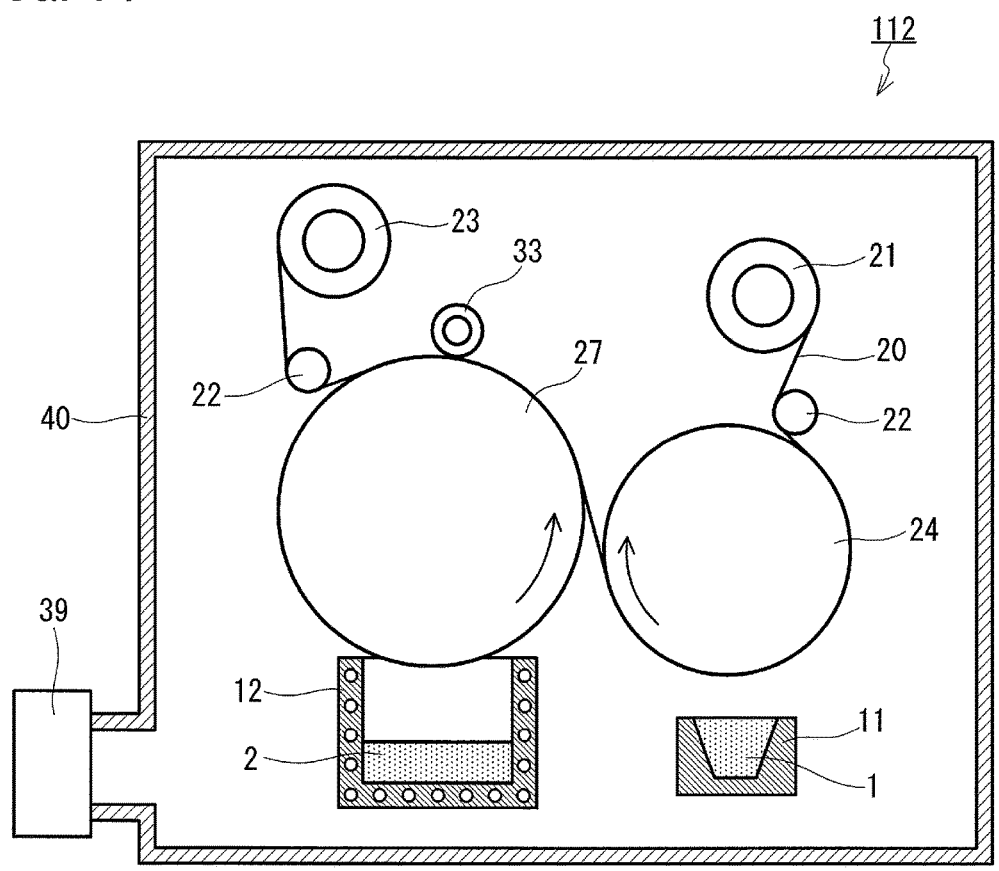
FIG. 14 is a schematic view showing still another example of the configuration of the thin film production apparatus according to the embodiment of the present invention.

In an example of the combination of the thin film production apparatus and the thin film production method of the present embodiment, a laminated film composed of a thin silicon film and a thin lithium film is produced on a copper foil substrate using the thin film production apparatus 112 of FIG. 14. The first film formation source 1 is an electron beam evaporation source, and silicon is used as the film formation material 1. The second film formation source 2 is a nozzle-type heater evaporation source, and lithium is used as the film formation raw material 2. The electron beam power of the first film formation source 1 and the temperature of the second film formation source 12 are adjusted so that the film deposition rate and the film thickness are 0.2 μm/second and 4 μm for the first thin film, and 1 μm/second and 1 μm for the second thin film. Thus, a laminated film in which an 1 μm-thick thin lithium film for compensating an irreversible capacity is stacked on a 4 μm-thick thin silicon film can be formed on the copper foil substrate at a high rate. The resulting laminated film can be used, for example, in a negative electrode of a battery. The electron beam power or the adjusted temperature of the film formation source varies depending on the shape or the like of the film formation source. For example, the electron beam power of the first film formation source 11 is such that the acceleration voltage is −30 kV and the emission current is 1 to 1.5 A, while the temperature of the second film formation source 12 is about 450 to 550° C.

Figure 15:
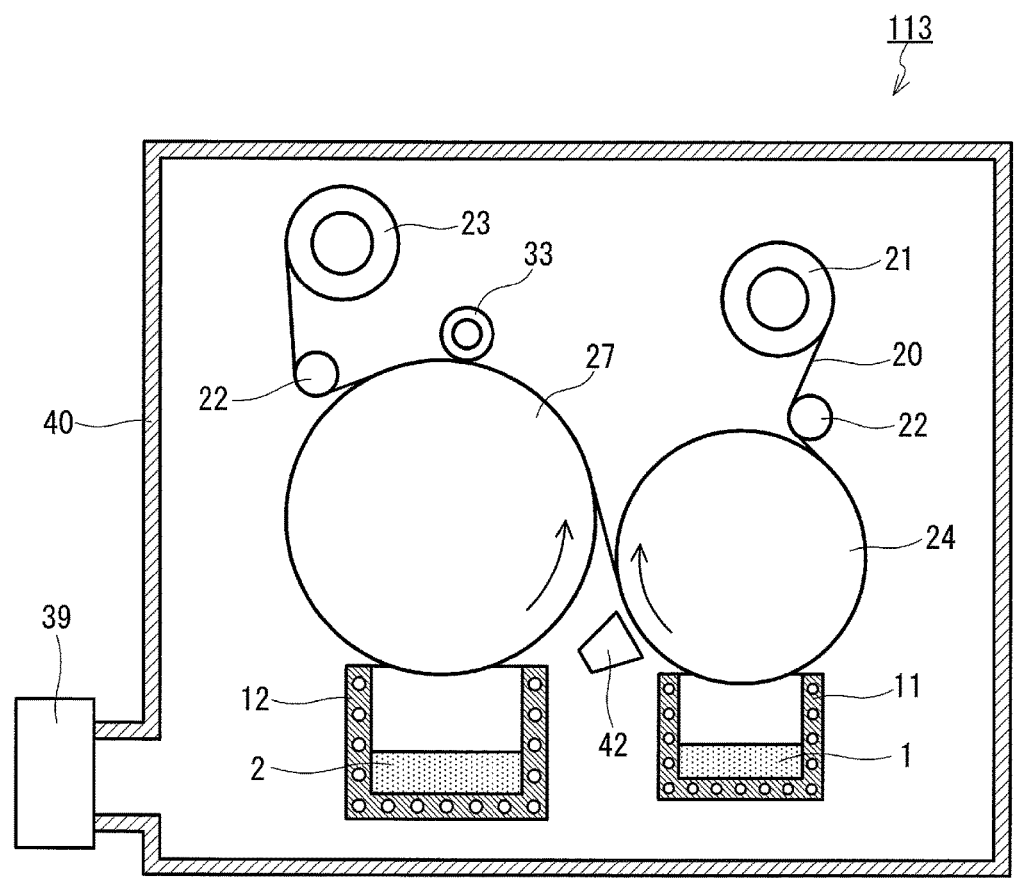
FIG. 15 is a schematic view showing still another example of the configuration of the thin film production apparatus according to the embodiment of the present invention.

In another example of the combination of the thin film production apparatus and the thin film production method of the present embodiment, a laminated film composed of a thin resin film and a thin lithium film is produced on a polypropylene substrate using the thin film production apparatus 113 of FIG. 15. A resin monomer is used as the film formation material 1, and lithium is used as the film formation raw material 2. In this example, thermal load imposed on the polypropylene substrate and the thin resin film by formation of the thin lithium film is reduced and, therefore, a high-quality laminated film can be produced at a high rate. The temperatures of the first film formation source 11 and the second film formation source 12 are adjusted so that the film deposition rate and the film thickness are 0.1 μm/second and 0.1 μm for the first thin film and 3 μm/second and 5 μm for the second thin film. Thus, a 5 μm-thick thin lithium film can be formed at a high rate on the polypropylene substrate with the thin resin film interposed therebetween. For example, with the use of the resulting laminated film, a thin lithium film for compensating an irreversible capacity, together with a protective resin film, can be transferred and formed on an electrode plate of a lithium-ion battery. In addition, with the use of a resin having release properties as the material of the thin resin film, a thin lithium film that is easy to transfer can be obtained. The adjusted temperatures of the film formation sources vary depending on the shapes or the like of the film formation sources. The temperature of the first film formation source 11 is, for example, about 150 to 200° C., while the temperature of the second film formation source 12 is, for example, about 520 to 620° C.

Figure 3:
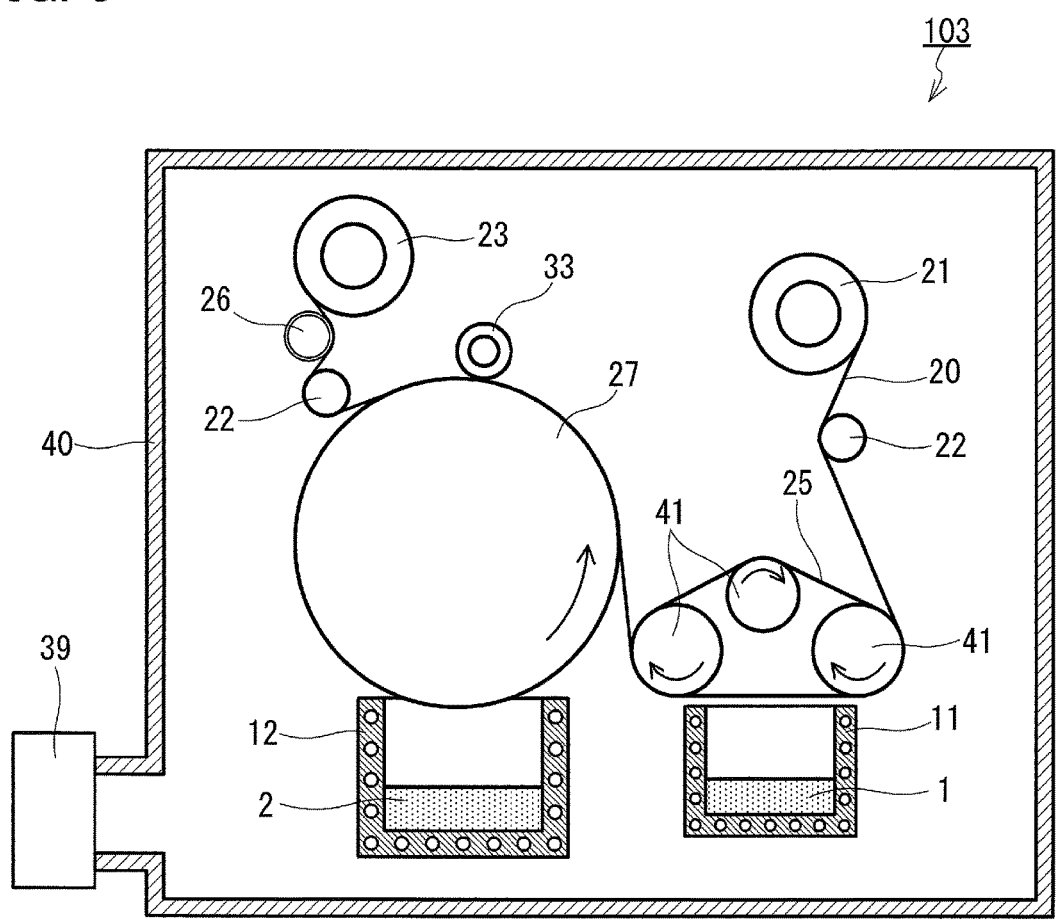
FIG. 3 is a schematic view showing still another example of the configuration of the thin film production apparatus according to the embodiment of the present invention.

In still another example of the combination of the thin film production apparatus and the thin film production method of the present embodiment, a thin lithium film is formed on a PET substrate using the thin film production apparatus 103 of FIG. 3. By carrying out film formation using lithium both as the film formation material 1 and as the film formation raw material 2, thermal load imposed on the PET substrate during the film formation can be reduced. Therefore, a high-quality thin lithium film can be formed on the PET substrate at a high rate. The temperatures of the first film formation source 11 and the second film formation source 12 are adjusted so that the film deposition rate and the film thickness are 1 μm/second and 1 μm for the first thin film and 3 μm/second and 5 μm for the second thin film. Thus, a 6 μm-thick thin lithium film can be formed on the PET substrate at a high rate. The adjusted temperatures of the film formation sources vary depending on the shapes or the like of the film formation sources. The temperature of the first film formation source 11 is, for example, about 450 to 550° C., while the temperature of the second film formation source 12 is, for example, about 520 to 620° C.

In still another example of the combination of the thin film production apparatus and the thin film production method of the present embodiment, a thin lithium film is produced on a battery separator using the thin film production apparatus 104 of FIG. 4. By carrying out film formation using lithium both as the film formation material 1 and as the film formation raw material 2, thermal load imposed on the battery separator during the film formation can be reduced. Therefore, a high-quality thin lithium film can be formed on the battery separator at a high rate. The temperatures of the first film formation source 11 and the second film formation source 12 are adjusted so that the film deposition rate and the film thickness are 0.1 μm/second and 0.4 μm for the first thin film and 2 μm/second and 4.6 μm for the second thin film. Thus, a 5 μm-thick thin lithium film can be formed on the battery separator at a high rate. The adjusted temperatures of the film formation sources vary depending on the shapes or the like of the film formation sources. The temperature of the first film formation source 11 is, for example, about 430 to 480° C., while the temperature of the second film formation 55 source 12 is, for example, about 480 to 580° C.

In still another example of the combination of the thin film production apparatus and the thin film production method of the present embodiment, a thin lithium film is produced on a battery separator using the thin film production apparatus 114 of FIG. 16. In this apparatus, one and the same material is used both as the film formation material 1 and as the film formation raw material 2. By carrying out film formation using lithium as one and the same material, thermal load imposed on the battery separator during the film formation can be reduced. Therefore, a high-quality thin lithium film can be formed on the battery separator at a high rate. The temperature of the combined film formation source 6 and the positions of the regulating plates 30 are adjusted so that the film deposition rate and the film thickness are 0.1 μm/second and 0.4 μm for the first thin film and 2 μm/second and 4.6 μm for the second thin film. Thus, a 5 μm-thick thin lithium film can be formed on the battery separator at a high rate. The adjusted temperature of the combined formation source 6 varies depending on the shape or the like of the film formation source, and is, for example, about 480 to 580° C. The film deposition rates and the film thicknesses can be regulated by displacing the regulating plates 30.

Although embodiments for carrying out the present invention have been specifically described above, the present invention is not limited to the above embodiments, and encompasses a thin film production apparatus including:

a substrate feeding mechanism configured to continuously feed an elongated substrate or a plate substrate;

a substrate receiving mechanism configured to receive the elongated substrate or the plate substrate by winding the elongated substrate thereon or storing the plate substrate therein;

a substrate conveying mechanism configured to convey the substrate from the substrate feeding mechanism to the substrate receiving mechanism;

a film formation roller configured to allow a film to be formed directly on a roller circumferential surface of the roller;

a first film formation source configured to form a first thin film on a film formation surface of the substrate traveling on an upstream side of the film formation roller in a substrate conveyance direction along the substrate conveying mechanism; and a second film formation source configured to form a second thin film on the roller circumferential surface of the film formation roller, wherein the film formation roller is placed on a substrate conveyance route so that a surface of the second thin film formed on the roller circumferential surface of the film formation roller is joined in a face-to-face manner to a surface of the first thin film formed on the film formation surface of the substrate, the substrate receiving mechanism winds thereon or stores therein the substrate, the first thin film, and the second thin film detached from the film formation roller, which have been integrated together, and the second thin film is formed on the roller circumferential surface of the film formation roller to a greater thickness and/or at a higher deposition rate than the first thin film.

In the present embodiment, the cases where lithium is used as the film formation materials to form thin lithium films as the first thin film and the second thin film have been mainly described as specific examples of the application of the present invention. However, the present invention is not limited to these examples. For example, also in the case where a thin film composed of a thin lithium film and another thin film is produced or where a thin film made of a material other than lithium is produced, the thin film production apparatus and the thin film production method of the present invention are effective in producing thin films having the same composition or different compositions while reducing the thermal load on the substrate.

Embodiment 2

An electrochemical device production method and an electrochemical device according to an embodiment of the present invention will be described.

The electrochemical device production method of the present embodiment is a method for producing an electrochemical device including: a positive electrode plate including a positive electrode active material that absorbs or releases lithium ions; a negative electrode plate including a negative electrode active material that releases or absorbs lithium ions; and a separator disposed between the positive electrode plate and the negative electrode plate and including an electrolyte having lithium ion conductivity. The production method of the present embodiment includes the steps of:

(i) employing the thin film production method described in Embodiment 1 in which a separator is used as the substrate and thin lithium films are formed as the first thin film and the second thin film, and thereby producing an electrochemical device separator including the separator as the substrate and a lithium layer formed on at least one principal surface of the separator;

(ii) producing an electrode assembly by overlaying a positive electrode plate including a positive electrode active material that absorbs or releases lithium ions, a negative electrode plate including a negative electrode active material that releases or absorbs lithium ions, and the electrochemical device separator obtained in the step (i) in such a manner that the electrochemical device separator is disposed between the positive electrode plate and the negative electrode plate, and then by winding or folding the positive electrode plate, the negative electrode plate, and the electrochemical device separator together, or producing an electrode assembly by laminating the positive electrode plate, the negative electrode plate, and the electrochemical device separator together in such a manner that the electrochemical device separator is disposed between the positive electrode plate and the negative electrode plate; and (iii) putting the electrode assembly in a casing and injecting an electrolyte having lithium ion conductivity into the casing.

(Step (i))

In the step (i), an electrochemical device separator is produced using the thin film production method described in Embodiment 1. That is, for example, the electrochemical device separator can be produced using any one of the thin film production apparatuses 101 to 114 described in Embodiment 1 and shown in FIG. 1 to FIG. 16, using a separator for use in electrochemical devices as the substrate 20, and using lithium both as the film formation material 1 and as the film formation raw material 2. The separator used is not particularly limited. Any material for use in separators for electrochemical devices such as various types of batteries can be used. For example, a microporous membrane made of polyethylene or polyolefin can be used as the separator.

In the electrochemical device separator produced in the step (i), at least two lithium layers are formed on the separator as the substrate. Tiny amount of water, impurities etc. contained in the separator may affect the lowermost lithium layer closest to the separator due to heat generated during film formation. Therefore, the lowermost lithium layer contains such impurities in some cases. By contrast, the uppermost lithium layer located on the outermost side is less likely to contain impurities or the like because the uppermost lithium layer is formed by transferring a thin lithium film formed on the film formation roller. Therefore, in the plurality of lithium layers formed on the separator, the uppermost lithium layer can have a higher lithium purity than the lowermost lithium layer. The lithium purity in each lithium layer means a lithium purity in the central portion in the thickness of the layer. For example, in the case where two lithium layers are formed on a separator, a second lithium layer formed on a first lithium layer closer to the separator has a higher lithium purity than the first layer. Due to the high purity of the lithium layer on the outer surface side, the contact resistance between the lithium layer and the active material is small when lithium constituting the lithium layers on the separator is absorbed into the active material. Therefore, it is possible to allow the absorption reaction to proceed smoothly.

It is preferable that, among the plurality of lithium layers formed on the separator, the uppermost lithium layer located on the outermost side have a surface that is flatter and smoother than the surface of the separator. In the production method of the present embodiment, the uppermost lithium layer can be formed by transfer of a thin lithium film formed on the film formation roller and, therefore, the flat and smooth profile of the surface of the film formation roller is reflected in the surface of the uppermost lithium layer. Accordingly, even when the surface of the separator is not flat or smooth, it is possible to reduce the influence of the surface profile of the separator on the outermost surface of the lithium layers and thus to make the outermost surface of the lithium layers flatter and smoother than the surface of the separator. Due to the flatness and smoothness of the lithium layer on the outer surface side, good contact between the lithium layer and the active material is achieved when lithium constituting the lithium layers on the separator is absorbed into the active material. Therefore, it is possible to allow the absorption reaction to proceed smoothly.

In the case where the electrochemical device separator is produced, for example, using any one of the thin film production apparatuses 101 to 105 and 107 to 114 described in Embodiment 1, an elongated separator having lithium layers formed thereon is wound on the winding roller 23, and a roll of the electrochemical device separator is obtained. In that case, the roll of the electrochemical device separator is further cut into a plurality of rolls of the electrochemical device separator that have a predetermined width depending on the size of the electrochemical device to be produced. Thus, electrochemical device separators can be obtained in each of which a lithium layer is formed to extend over the entire width of the separator from edge to edge.

(Step (ii))

An electrode assembly is produced using the electrochemical device separator obtained in the step (i). The electrode assembly can be produced as follows: the positive electrode plate, the negative electrode plate, and the electrochemical device separator are overlaid on each other in such a manner that the electrochemical device separator is disposed between the positive electrode plate and the negative electrode plate, and then are wound or folded together; or the positive electrode plate, the negative electrode plate, and the electrochemical device separator are laminated together in such a manner that the electrochemical device separator is disposed between the positive electrode plate and the negative electrode plate. At this time, the electrochemical device separator, the positive electrode plate, and the negative electrode plate are disposed in such a manner that a widthwise edge of the electrochemical device separator is located outwardly of a widthwise edge of at least one of the positive electrode plate and the negative electrode plate. Therefore, the widthwise dimension of the electrochemical device separator is desirably greater than the widthwise dimension of the positive electrode plate and the negative electrode plate so that a widthwise edge of the electrochemical device separator can be located outwardly of a widthwise edge of at least one of the positive electrode plate and the negative electrode plate.

It suffices for the positive electrode plate to include a positive electrode active material that absorbs or releases lithium ions, and a commonly-known positive electrode plate for use in lithium-ion secondary batteries can be used. Also, it suffices for the negative electrode plate to include a negative electrode active material that releases or absorbs lithium ions, and a commonly-known negative electrode plate for use in lithium-ion secondary batteries can be used. A negative electrode plate produced by one of those combinations of the thin film production apparatus and the thin film production method which have been described as specific examples in Embodiment 1 may be used.

(Step (iii))

The electrode assembly obtained by the step (ii) is put into a casing, and an electrolyte having lithium ion conductivity is injected into the casing. The casing used at this time is not particularly limited, and a commonly-known metal battery can or envelope-shaped bag formed of a laminated sheet can be used. The electrolyte is not particularly limited; for example, a commonly-known electrolyte for lithium-ion secondary batteries can be used. As a result of the injection of the electrolyte, lithium of the lithium layers included in the electrochemical device separator is absorbed into the active material of the electrode plate. However, lithium provided on that portion of the separator which is located outwardly of the widthwise edge of the electrode plate does not contribute to charge and discharge, and thus often remains on the separator even after charge and discharge. That is, a lithium layer disposed on a portion of at least one of the positive electrode plate-facing side and the negative electrode plate-facing side of the separator is not absorbed into the active material but remains, the portion being in the vicinity of the widthwise edge of the separator and extending beyond the widthwise edge of the at least one of the positive electrode plate and the negative electrode plate. That is, lithium is present on that portion of at least one of the positive electrode plate-facing side and the negative electrode plate-facing side of the separator which is in the vicinity of the widthwise edge of the separator and which extends beyond the widthwise edge of the at least one of the positive electrode plate and the negative electrode plate.

The electrochemical device of the present embodiment obtained by the above-described method has the following structural features.

The electrochemical device includes: a positive electrode plate including a positive electrode active material that absorbs or releases lithium ions; a negative electrode plate including a negative electrode active material that releases or absorbs lithium ions; and a separator disposed between the positive electrode plate and the negative electrode plate and including an electrolyte having lithium ion conductivity.

The positive electrode plate, the negative electrode plate, and the separator form an electrode assembly by being overlaid on each other in such a manner that the separator is disposed between the positive electrode plate and the negative electrode plate and being wound or folded together, or the positive electrode plate, the negative electrode plate, and the separator form an electrode assembly by being laminated together in such a manner that the separator is disposed between the positive electrode plate and the negative electrode plate.

A widthwise edge of the separator is located outwardly of a widthwise edge of at least one of the positive electrode plate and the negative electrode plate.

Lithium is provided on a portion of at least one of the positive electrode plate-facing side and the negative electrode plate-facing side of the separator, the portion being in the vicinity of the widthwise edge of the separator and extending beyond the widthwise edge of the at least one of the positive electrode plate and the negative electrode plate.

Figure 17:
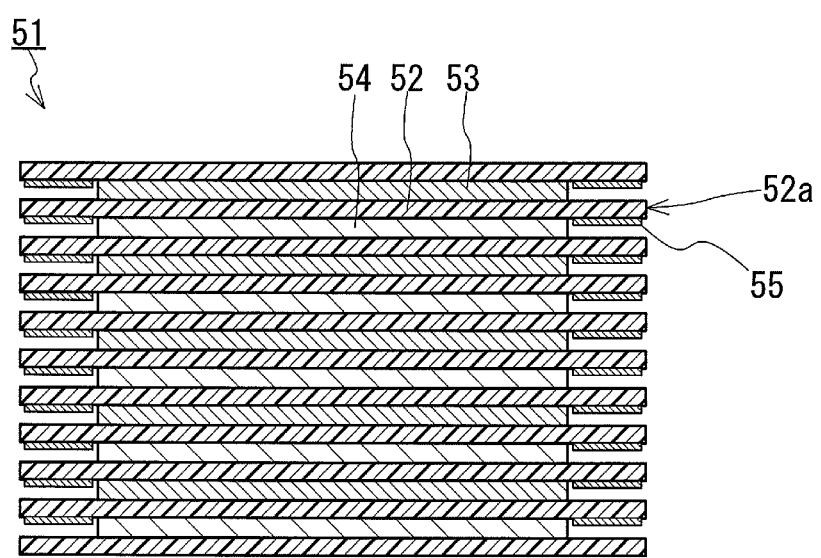
FIG. 17 is a schematic cross-sectional view showing an example of a configuration of an electrode assembly of an electrochemical device according to an embodiment of the present invention.

FIG. 17 shows a schematic cross-sectional view of an example of the configuration of the electrode assembly in the electrochemical device of the present embodiment. The electrode assembly 51 is formed by laminating together separators 52, positive electrode plates 53, and negative electrode plates 54 in such a manner that each separator 52 is disposed between the positive electrode plate 53 and the negative electrode plate 54. The widthwise edges 52a of the separator 52 are located outwardly of the widthwise edges of the positive electrode plate 53 and the negative electrode plate 54. Lithium 55 is provided on those portions of at least one of the positive electrode plate-facing side and the negative electrode plate-facing side of each separator 52 which are in the vicinity of the widthwise edges 52a and which extend beyond the widthwise edges of the positive electrode plate 53 and the negative electrode plate 54.

In the electrode assembly 51, separators 52 each provided with the lithium 55 in the vicinity of the widthwise edges 52a face each other across the electrode plate 53 or 54, and the presence of the lithium 55 serves to block slippage between the separator 52 and the electrode plate 53 or 54. Therefore, the occurrence of the misalignment (misalignment in lamination) in the width direction in the electrode assembly 51 can be reduced. In addition, with this configuration, the separators 52 can be joined to each other partly at their widthwise edges 52a with the aid of the lithium 55 provided in the vicinity of the widthwise edges 52a of the separators 52. In that case, the occurrence of the misalignment in the width direction in the electrode assembly 51 can be more reliably reduced. The junction between the separators 52 at their widthwise edges 52a by means of the lithium 55 is as previously described.

The thin film production apparatus and the thin film production method of the present embodiment can solve the problem of thermal damage to a substrate caused by a high film formation rate, and can achieve both reduction in thermal load on the substrate and a high-rate film formation in continuous production of thin films on the substrate. Therefore, the thin film production apparatus and the thin film production method of the present embodiment can be suitably used in various applications requiring low-cost formation of high-quality thin films, such as in production of electrode plates and separators for lithium-ion secondary batteries, of electrode plates for electrochemical capacitors, of capacitors, of solar cells, and of various sensors.

The specific embodiments or examples presented in DETAILED DESCRIPTION OF THE INVENTION are only intended to clarify the technical contents of the present invention, and the present invention should not be restrictively construed based on only the specific examples. The present invention can be carried out by making various modifications within the spirit of the present invention and the scope of the claims provided below.

What is claimed is:

1. A thin film production apparatus comprising:
a substrate feeding mechanism configured to continuously feed an elongated substrate or a plate substrate;

a substrate receiving mechanism configured to receive the elongated substrate or the plate substrate by winding the elongated substrate thereon or storing the plate substrate therein;

a substrate conveying mechanism configured to convey the substrate from the substrate feeding mechanism to the substrate receiving mechanism;

a film formation roller configured to allow a film to be formed directly on a roller circumferential surface of the roller;

a first film formation source configured to form a first thin film on a film formation surface of the substrate traveling on an upstream side of the film formation roller in a substrate conveyance direction along the substrate conveying mechanism; and a second film formation source configured to form a second thin film on the roller circumferential surface of the film formation roller, the second film formation source forms the second thin film by deposition of a film formation raw material for the second thin film on the roller circumferential surface of the film formation roller, wherein the film formation roller is placed on a substrate conveyance route so that a surface of the second thin film formed on the roller circumferential surface of the film formation roller is joined in a face-to-face manner to a surface of the first thin film formed on the film formation surface of the substrate, the substrate receiving mechanism winds thereon or stores therein the substrate, the first thin film, and the second thin film detached from the film formation roller, which have been integrated together, the second thin film is formed on the roller circumferential surface of the film formation roller to a greater thickness and/or at a higher deposition rate than the first thin film, and the second thin film on the roller circumferential surface of the film formation roller is transferred directly from the film formation roller onto the first thin film by joining the surface of the first thin film and the surface of the second thin film in a face-to-face manner.

2. The thin film production apparatus according to claim 1, wherein a single combined film formation source serves both as the first film formation source and the second film formation source.

3. The thin film production apparatus according to claim 1, further comprising a junction-enhancement mechanism configured to enhance junction between the first thin film and the second thin film that are joined in a face-to-face manner.

4. The thin film production apparatus according to claim 3, wherein the junction-enhancement mechanism is
(A) a mechanism configured to provide at least one of heat and pressure to the first thin film and the second thin film that have been joined in a face-to-face manner,
(B) a mechanism configured to emit an ultrasonic wave or a laser beam to the first thin film and the second thin film that have been joined in a face-to-face manner, or
(C) an adhesive agent applying unit configured to apply an adhesive agent to the surface of the first thin film on the film formation surface of the substrate or to the surface of the second thin film on the roller circumferential surface of the film formation roller.

5. The thin film production apparatus according to claim 1, further comprising a release agent applying unit configured to apply a release agent to the roller circumferential surface of the film formation roller.

6. The thin film production apparatus according to claim 5, wherein
the release agent is a liquid, and
the release agent applying unit comprises a mechanism configured to vaporize the release agent.

7. The thin film production apparatus according to claim 1, wherein the first film formation source and the second film formation source are adapted to foul' thin films having the same composition.

8. The thin film production apparatus according to claim 7, wherein the first film formation source and the second film formation source are adapted to form thin lithium films.

9. The thin film production apparatus according to claim 1, wherein the elongated substrate or the plate substrate engages the first film formation source prior to contacting the film formation roller.

10. The thin film production apparatus according to claim 1, wherein the second thin film is transferred directly from the film formation roller onto the first thin film.

11. The thin film production apparatus according to claim 1, wherein the first film formation source is located downstream of the substrate feeding mechanism in the substrate conveyance direction.

12. The thin film production apparatus according to claim 1, wherein the first film formation source is placed on an upstream side of the film formation roller in the substrate conveyance direction.

* * * * *